(12) United States Patent
Chen et al.

(10) Patent No.: US 11,729,684 B1
(45) Date of Patent: Aug. 15, 2023

(54) LOW LATENCY SCHEDULE-DRIVEN HANDOVERS

(71) Applicant: Space Exploration Technologies Corp., Hawthorne, CA (US)

(72) Inventors: Chen Chen, Irvine, CA (US); Pavel Chikulaev, Redmond, WA (US); Sergii Ziuzin, Redmond, WA (US); David Sacks, Redmond, WA (US); Peter J. Worters, San Carlos, CA (US); Darshan Purohit, Fremont, CA (US); Yashodhan Dandekar, Cupertino, CA (US); Vladimir Skuratovich, Seattle, WA (US); Andrei Pushkin, Woodinville, WA (US); Phillip E. Barber, Sammamish, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 17/337,214

(22) Filed: Jun. 2, 2021

Related U.S. Application Data

(60) Provisional application No. 63/035,443, filed on Jun. 5, 2020.

(51) Int. Cl.
| | |
|---|---|
| *H04W 36/06* | (2009.01) |
| *H04B 7/06* | (2006.01) |
| *H04B 7/185* | (2006.01) |
| *H04W 36/08* | (2009.01) |

(52) U.S. Cl.
CPC .......... *H04W 36/06* (2013.01); *H04B 7/0695* (2013.01); *H04B 7/18513* (2013.01); *H04W 36/08* (2013.01)

(58) Field of Classification Search
CPC .... H04W 36/06; H04W 36/08; H04B 7/0695; H04B 7/18513
See application file for complete search history.

(56) References Cited

U.S. PATENT DOCUMENTS

| | | | |
|---|---|---|---|
| 6,321,088 B1* | 11/2001 | Dempo | H04B 7/18541 |
| | | | 455/13.1 |
| 10,411,362 B2* | 9/2019 | Hreha | H04W 72/23 |
| 2016/0323800 A1* | 11/2016 | Ulupinar | H04B 7/2041 |
| 2017/0078978 A1* | 3/2017 | Scipione | H04W 52/18 |
| 2017/0099120 A1* | 4/2017 | Damnjanovic | H04B 7/2041 |
| 2017/0230104 A1* | 8/2017 | Purkayastha | H04B 7/2041 |
| 2018/0199328 A1* | 7/2018 | Sang | H04B 7/0617 |

(Continued)

*Primary Examiner* — Harry H Kim
(74) *Attorney, Agent, or Firm* — Polsinelli PC

(57) ABSTRACT

Systems, methods, and non-transitory media are provided for low latency handovers. An example method can include receiving, by a user terminal associated with a cell served by a satellite, a schedule of communications between the user terminal and one or more satellites; requesting, based on the schedule, a handover from a beam of the satellite to a different beam of one of the satellite or a different satellite; processing packets transmitted over the beam of the satellite and/or the different beam of the one of the satellite or the different satellite; performing the handover from the beam of the satellite to the different beam of the one of the satellite or the different satellite; and after the handover, transmitting, by the user terminal, one or more packets via the different beam of the one of the satellite or the different satellite.

20 Claims, 14 Drawing Sheets

(56) References Cited

U.S. PATENT DOCUMENTS

| | | | |
|---|---|---|---|
| 2019/0199428 A1* | 6/2019 | Regunathan | H04L 7/0008 |
| 2020/0314708 A1* | 10/2020 | Jassal | H04W 36/08 |
| 2021/0119697 A1* | 4/2021 | Wang | H04B 7/18589 |
| 2022/0095179 A1* | 3/2022 | Qiao | H04B 7/18541 |
| 2023/0034163 A1* | 2/2023 | Kim | H04B 7/02 |

* cited by examiner

LOW LATENCY SCHEDULE-DRIVEN HANDOVERS

CROSS-REFERENCE TO RELATED APPLICATIONS

This application claims priority to U.S. Provisional Patent Application No. 63/035,443, filed on Jun. 5, 2020, entitled "LOW LATENCY SCHEDULE-DRIVEN HANDOVERS", the contents of which are hereby incorporated by reference in their entirety and for all purposes.

TECHNICAL FIELD

The present disclosure generally relates to wireless communications systems and, more specifically, to handovers in wireless communications systems.

BACKGROUND

In wireless communications, a handover (or handoff) can involve a process of transferring a wireless device's access to a network from one link or channel to a different link or channel. For example, in satellite communications, a handover can involve transferring a satellite link to a ground station, user terminal, cell or gateway from one satellite to another satellite or from one beam on a satellite to a different beam on the same satellite. A handover can occur when a wireless device in a communication session needs to transfer the communication session to a different link to avoid a loss or interruption of service. In one illustrative example, a handover can occur when a satellite moves outside of a coverage area and a link or session between the satellite and a wireless device(s) in the coverage area needs to be transferred to another satellite capable of serving the coverage area. In another illustrative example, a handover can occur when a mobile terminal moves outside the coverage area of its base station or satellite and a handover to another base station or satellite is needed to avoid a loss or interruption of service.

The need in the art for effective handover technologies has steadily increased as device mobility and wireless communications become increasingly prevalent. However, wireless handover technologies often experience perceptible latencies and loss or interruption of service. Moreover, wireless handover technologies generally have limited scalability, flexibility, and efficiency. Unfortunately, such limitations in wireless handover technologies can have significant consequences for the user or subscriber, including abrupt termination of ongoing communication sessions, service degradation, and reduced handover performance. These problems are exacerbated in more complex wireless environments such as satellite-based communication environments.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously explained, there is an increasing need in the art for effective handover technologies for wireless communications. However, wireless handover technologies can experience perceptible latencies and loss or interruption of service. Moreover, wireless handover technologies have generally limited scalability, flexibility, and efficiency. In satellite-based communication systems, handover procedures can face particularly difficult challenges and limitations. The complexity of satellite-based communication systems, the moving velocity of satellites, the relative distances between satellites and satellite terminals, and the beam pointing accuracy associated with the satellites and satellite terminals—among other constraints—can significantly degrade a user's or subscriber's wireless experience, increase handover latencies, and reduce the availability and scalability of wireless services.

Disclosed herein are systems, methods, and computer-readable media for low latency handovers in wireless communication systems. In some examples, the disclosed technologies can provide a schedule-driven handover scheme that enables low latency handovers between satellites and satellite terminals such as, for example, user terminals, satellite gateways, satellite cells, etc. The schedule-driven handover scheme can predict or schedule handover events and/or needs in advance in order to provide seamless, stable, and efficient handovers. The disclosed handover approaches herein can significantly reduce handover latencies and increase the scalability and flexibility of wireless services.

Figure 9:
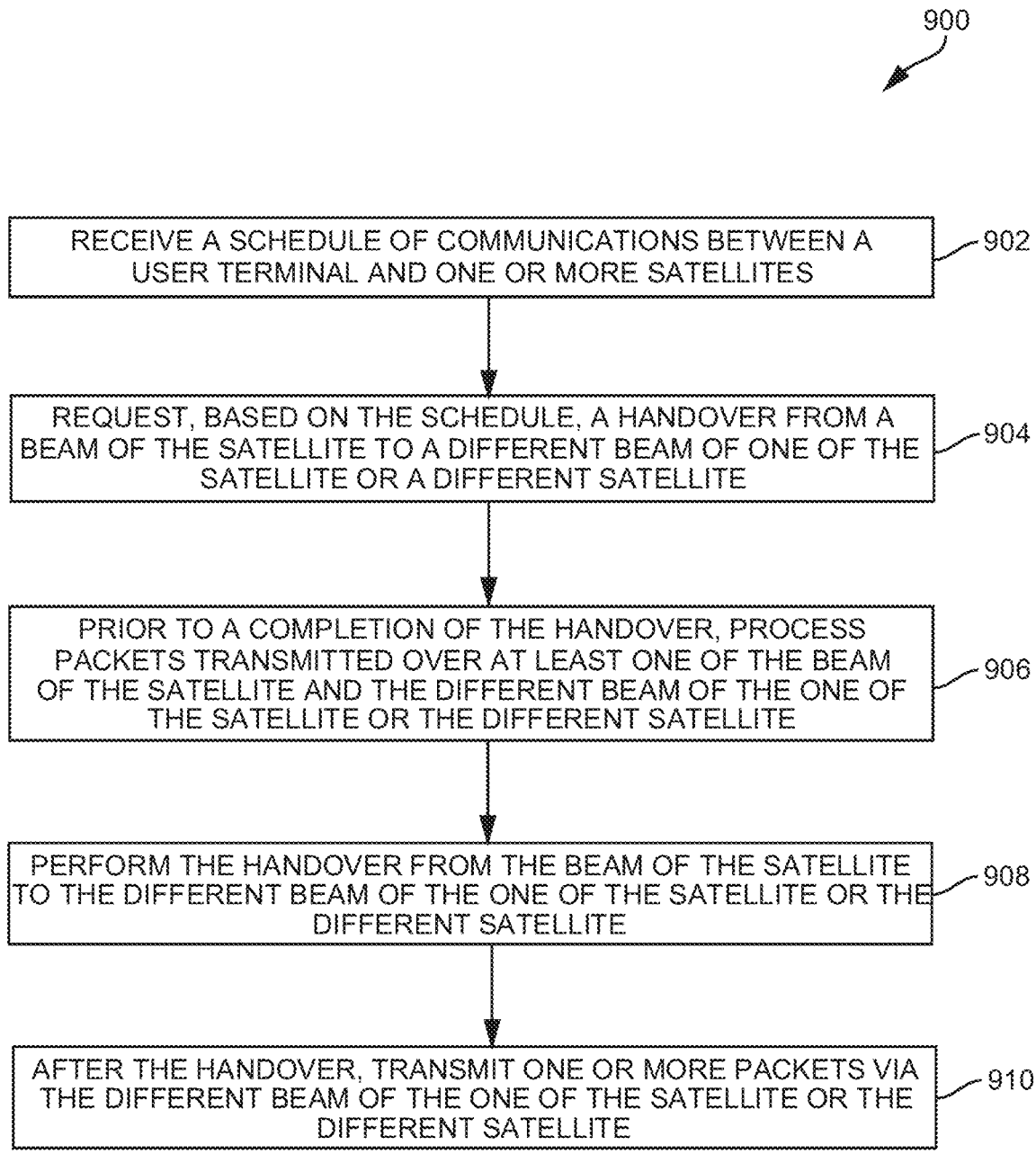
FIG. 9 is a flowchart illustrating an example method for performing low latency handover, in accordance with some examples of the present disclosure.
Figure 10:
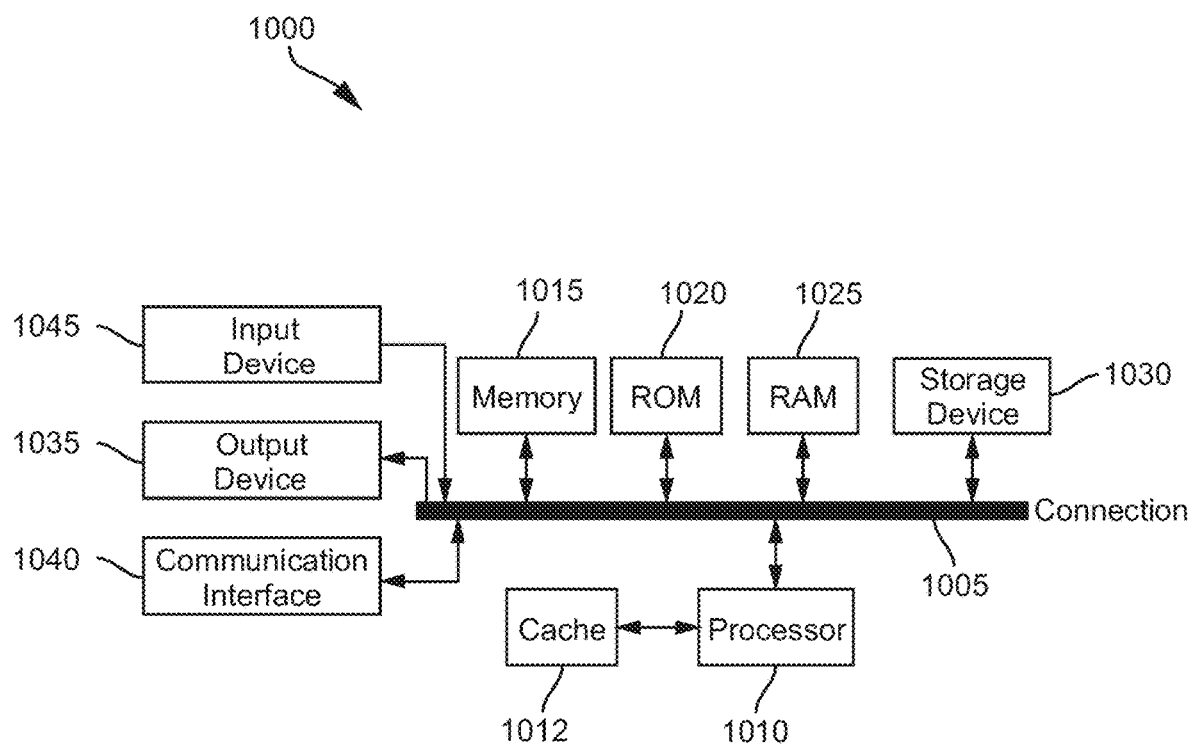
FIG. 10 illustrates an example computing device architecture, in accordance with some examples of the present disclosure.

The present technologies will be described in the following disclosure as follows. The discussion begins with a description of example systems and technologies for wireless communications and wireless handovers, as illustrated in FIGS. 1A through 8. A description of an example method for performing a low latency handover, as illustrated in FIG. 9, will then follow. The discussion concludes with a description of an example computing device architecture including example hardware components suitable for performing multi-user uplink time synchronization, as illustrated in FIG. 10. The disclosure now turns to FIG. 1A.

Figure 1A:
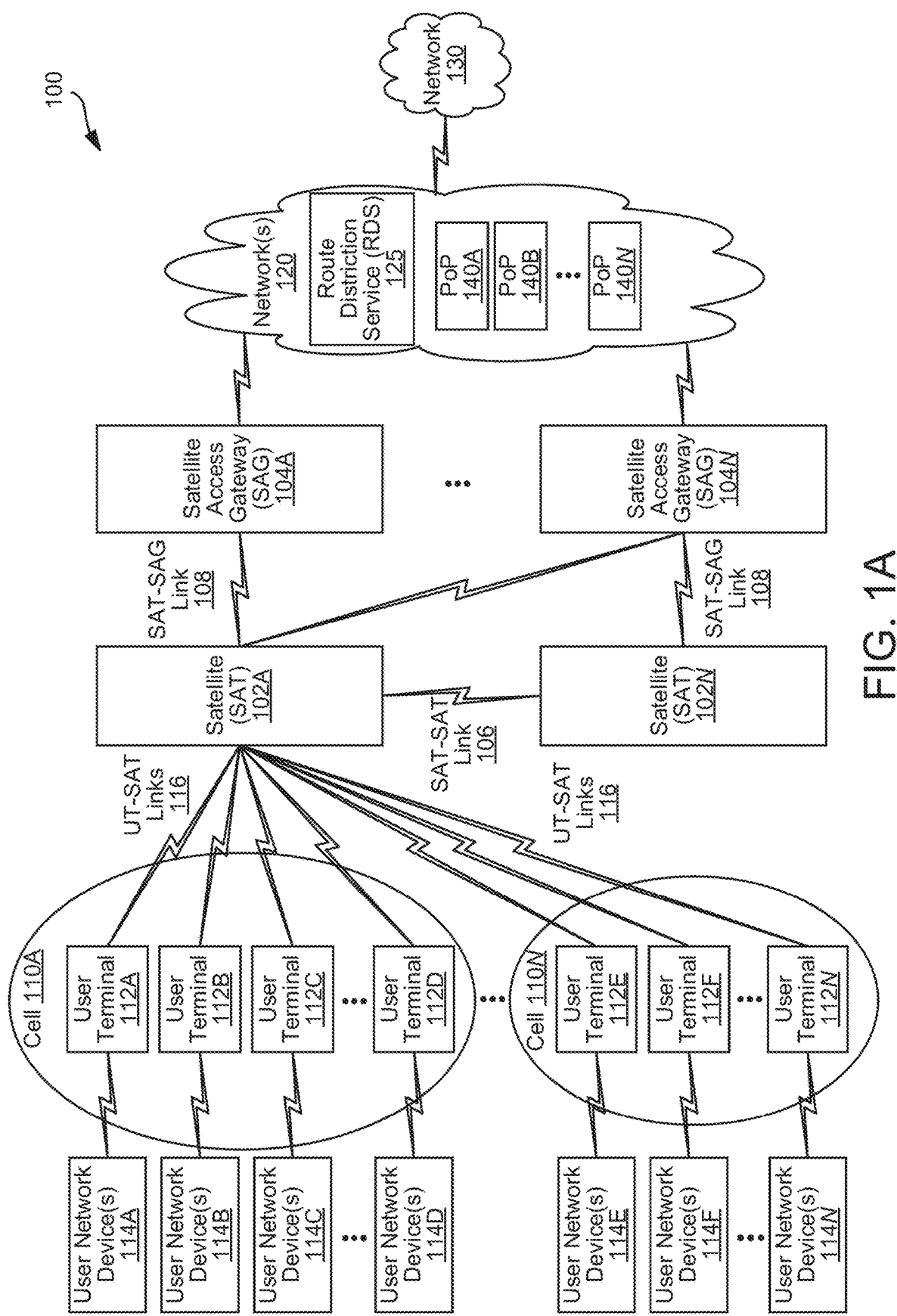
FIG. 1A is a simplified diagram illustrating an example wireless communication system, in accordance with some examples of the present disclosure.

FIG. 1A is a block diagram illustrating an example wireless communication system 100, in accordance with some examples of the present disclosure. In this example, the wireless communication system 100 is a satellite-based communication system and includes one or more satellites (SATs) 102A-102N (collectively "102"), one or more satellite access gateways (SAGs) 104A-104N (collectively "104"), user terminals (UTs) 112A-112N (collectively "112"), user network devices 114A-114N (collectively "114"), one or more networks 120, a route distribution service (RDS) 125, and one or more point-of-presence (PoP) sites 140A-N (collectively "140") in communication with a network 130, such as the Internet.

The SATs 102 can include orbital communications satellites capable of communicating (directly and/or indirectly) with other wireless devices or networks (e.g., 104, 112, 114, 120, 130) via radio telecommunications signals. The SATs 102 can provide communication channels, such as radio frequency (RF) links (e.g., 106, 108, 116), between the SATs 102 and other wireless devices located at different locations on Earth and/or in orbit. In some examples, the SATs 102 can establish communication channels for Internet, radio, television, telephone, radio, military, and/or other applications.

The user terminals 112 can include any electronic devices and/or physical equipment that support RF communications to and from the SATs 102. Similarly, the SAGs 104 can include gateways or earth stations that support RF communications to and from the SATs 102. The user terminals 112 and the SAGs 104 can include antennas for wirelessly communicating with the SATs 102. The user terminals 112 and the SAGs 104 can also include satellite modems for modulating and demodulating radio waves used to communicate with the SATs 102. In some examples, the user terminals 112 and/or the SAGs 104 can include one or more server computers, routers, ground receivers, earth stations, user equipment, antenna systems, communication nodes, base stations, access points, and/or any other suitable device or equipment. In some cases, the user terminals 112 and/or the SAGs 104 can perform phased-array beam-forming and digital-processing to support highly directive, steered antenna beams that track the SATs 102. Moreover, the user terminals 112 and/or the SAGs 104 can use one or more frequency bands to communicate with the SATs 102, such as the Ku and/or Ka frequency bands. In some cases, any of the user terminals 112, SATs 102, and/or SAGs 104 can also have multiple beams connecting to multiple entities (e.g., other user terminals, SATs, SAGs, etc.) simultaneously.

The user terminals 112 can be used to connect the user network devices 114 to the SATs 102 and ultimately the Internet (e.g., network 130). The SAGs 104 can be used to connect the one or more PoP sites 140, the one or more networks 120 and the Internet (e.g., network 130) to the SATs 102. For example, the SAGs 104 can relay communications from the PoP sites 140, the one or more networks 120 and/or the Internet (e.g., network 130) to the SATs 102, and communications from the SATs 102 (e.g., communications originating from the user network devices 114, the user terminals 112, or the SATs 102) to the PoP sites 140, the one or more networks 120 and/or the Internet (e.g., network 130).

The user network devices 114 can include any electronic devices with networking capabilities and/or any combination of electronic devices such as a computer network. For example, the user network devices 114 can include routers, network modems, switches, access points, laptop computers, servers, tablet computers, set-top boxes, Internet-of-Things (IoT) devices, smart wearable devices (e.g., head-mounted displays (HMDs), smart watches, etc.), gaming consoles, smart televisions, media streaming devices, autonomous vehicles, robotic devices, user networks, sensors, end-user devices, etc.

Each PoP site from the one or more PoP sites 140 can include an interface and/or access point to the Internet (e.g., network 130). Moreover, each PoP site can include one or more servers, routers, switches, multiplexers, data centers, base stations, modems, carrier facilities, and/or any other network equipment. In some cases, the one or more PoP sites 140 can be part of, or implemented by, one or more Internet Service Providers (ISPs), one or more external networks, one or more telecommunication companies, content delivery networks, and/or any other company, facility, and/or network. In some examples, the one or more PoP sites 140 can be part of, or hosted in, the one or more networks 120. In other examples, the one or more PoP sites 140 can be separate from the one or more networks 120.

The RDS 125 can include a network topology service configured to distribute communication schedules to devices in the wireless communication system 100 such as, for example, the UTs 112, the SATs 102, the SAGs 104, the PoP sites 140, etc. In some examples, the schedules can define what entities (e.g., 102, 104, 112, 140) should communicate with what other entities, when certain entities should communicate with certain other entities, etc. For example, a schedule can indicate that UT 112A should communicate with SAT 102B and/or that SAT 102A should not communicate with UT 112A, and can define one or more time slots and/or radio frames in which UT 112A (and any other UTs)

and SAT 102B should communicate with each other. In some cases, the schedule can indicate that SAT 102B should communicate with one or more UTs in one or more cells (e.g., cell 110A, cell 110/V), such as UT 112A, and can define one or more time slots and/or radio frames for one or more communications between the SAT 102B and the one or more UTs.

In some cases, the schedules can indicate which SAT, SAG, UT, and/or PoP site should be included in, or part of, a communication link and/or communication session between a UT and a SAT. In some cases, the schedules can also indicate one or more time slots to the SAT, SAG, UT, and/or Pop site to communicate in. Moreover, in some cases, a schedule can identify a handover and/or handover period that one or more entities (e.g., 102, 104, 112, 140) should perform to transfer a communication link and/or session from one entity to another (e.g., from one SAT to another, from one SAG to another, from one PoP site to another, etc.).

The RDS 125 can generate schedules in advance (e.g., prior to a handover, a communication link, a communication session, an event, etc.) and distribute the schedules to one or more devices. In some examples, the RDS 125 can generate schedules based on topology information and/or information about the devices in the environment. For example, the RDS 125 can generate schedules based on ephemeris data (e.g., velocity, position, etc.) of the SATs 102; location information associated with the UTs 112, SAGs 104, and/or PoP sites 140; information about asset availability at one or more times (e.g., availability of UTs, SATs, SAGs, PoP sites, etc.); information about a current topology of the wireless communication system 100; information about current communication sessions and/or links in the wireless communication system 100, network conditions (e.g., latency, bandwidth, traffic loads, resource failures, etc.); quality-of-service (QoS) requirements associated with one or more devices; and/or any other factor(s) for managing traffic, sessions and/or communication links in the wireless communication system 100.

The one or more networks 120 can include one or more networks and/or data centers. For example, the one or more networks 120 can include a public cloud, a private cloud, a hybrid cloud, an ISP, a backbone or core network, an external network, an enterprise network, a service provider network, an on-premises network, and/or any other network. Moreover, the one or more networks 120 can have connectivity to the Internet (e.g., network 130). In some cases, the one or more networks 120 can have connectivity to the Internet (e.g., network 130) through the one or more PoP sites 140. In other cases, the one or more networks 120 can have connectivity to the Internet (e.g., network 130) with or without the one or more PoP sites 140.

In some cases, the SATs 102 can establish communication links between the SATs 102 and the user terminals 112. For example, SAT 102A can establish communication links 116 between the SAT 102A and the user terminals 112A-D and/or 112E-N. The communication links 116 can provide communication channels between the SAT 102A and the user terminals 112A-D and/or 112E-N. In some examples, the user terminals 112 can be interconnected (e.g., via wired and/or wireless connections) with the user network devices 114. Thus, the communication links between the SATs 102 and the user terminals 112 can enable communications between the user network devices 114 and the SATs 102. In some examples, each of the SATs 102A-N can serve user terminals 112 distributed across and/or located within one or more cells 110A-110N (collectively "110"). The cells 110 can represent geographic areas served and/or covered by the SATs 102. For example, each cell can represent an area corresponding to the satellite footprint of radio beams propagated by a SAT. In some cases, a SAT can cover a single cell. In other cases, a SAT can cover multiple cells. In some examples, a plurality of SATs 102 can be in operation simultaneously at any point in time (also referred to as a satellite constellation). Moreover, different SATs can serve different cells and sets of user terminals.

The SATs 102 can also establish communication links 106 with each other to support inter-satellite communications. Moreover, the SATs 102 can establish communication links 108 with the SAGs 104. In some cases, the communication links between the SATs 102 and the user terminals 112 and the communication links between the SATs 102 and the SAGs 104 can allow the SAGs 104 and the user terminals 112 to establish a communication channel between the user network devices 114, the one or more networks 120, the one or more PoP sites 140, and ultimately the Internet (e.g., network 130). For example, the user terminals 112A-D and/or 112E-N can connect the user network devices 114A-D and/or 114E-N to the SAT 102A through the communication links 116 between the SAT 102A and the user terminals 112A-D and/or 112E-N. The SAG 104A can connect the SAT 102A to a PoP site 140A on the one or more networks 120, which can connect the SAGs 104A-N to the network 130. Thus, the communication links 108 and 116, the SAT 102A, the SAG 104A, the user terminals 112A-D and/or 112E-N, the PoP sites 140 and the one or more networks 120 can allow the user network devices 114A-D and/or 114E-N to connect to the Internet (e.g., network 130).

In some examples, a user can initiate an Internet connection and/or communication through a user network device from the user network devices 114. The user network device can have a network connection to a user terminal from the user terminals 112, which it can use to establish an uplink (UL) pathway to the Internet (e.g., network 130). The user terminal can wirelessly communicate with a particular SAT from the SATs 102, and the particular SAT can wirelessly communicate with a particular SAG from the SAGs 104. The particular SAG can be in communication (e.g., wired and/or wireless) with the one or more PoP sites 140 and/or the one or more networks 120 and, by extension, the network 130. Thus, the particular SAG can enable the Internet connection and/or communication from the user network device to the one or more PoP sites 140 and networks 120 and, by extension, the network 130.

In some cases, the particular SAT and SAG can be selected based on signal strength, line-of-sight, and the like. If a SAG is not immediately available to receive communications from the particular SAT, the particular SAG can be configured to communicate with another SAT. The second SAT can in turn continue the communication pathway to a particular SAG. Once data from the network 130 is obtained for the user network device, the communication pathway can be reversed using the same or different SAT and/or SAG as used in the UL pathway.

In some examples, the communication links (e.g., 106, 108, and 116) in the wireless communication system 100 can operate using orthogonal frequency division multiple access (OFDMA) via both time domain and frequency domain multiplexing. OFDMA, also known as multicarrier modulation, transmits data over a bank of orthogonal subcarriers harmonically related by the fundamental carrier frequency. Moreover, in some cases, for computational efficiency, fast Fourier transforms (FFT) and inverse FFT can be used for modulation and demodulation.

While the wireless communication system 100 is shown to include certain elements and components, one of ordinary skill will appreciate that the wireless communication system 100 can include more or fewer elements and components than those shown in FIG. 1A. For example, the wireless communication system 100 can include, in some instances, networks, cellular towers, communication hops or pathways, network equipment, and/or other electronic devices that are not shown in FIG. 1A.

Figure 1B:
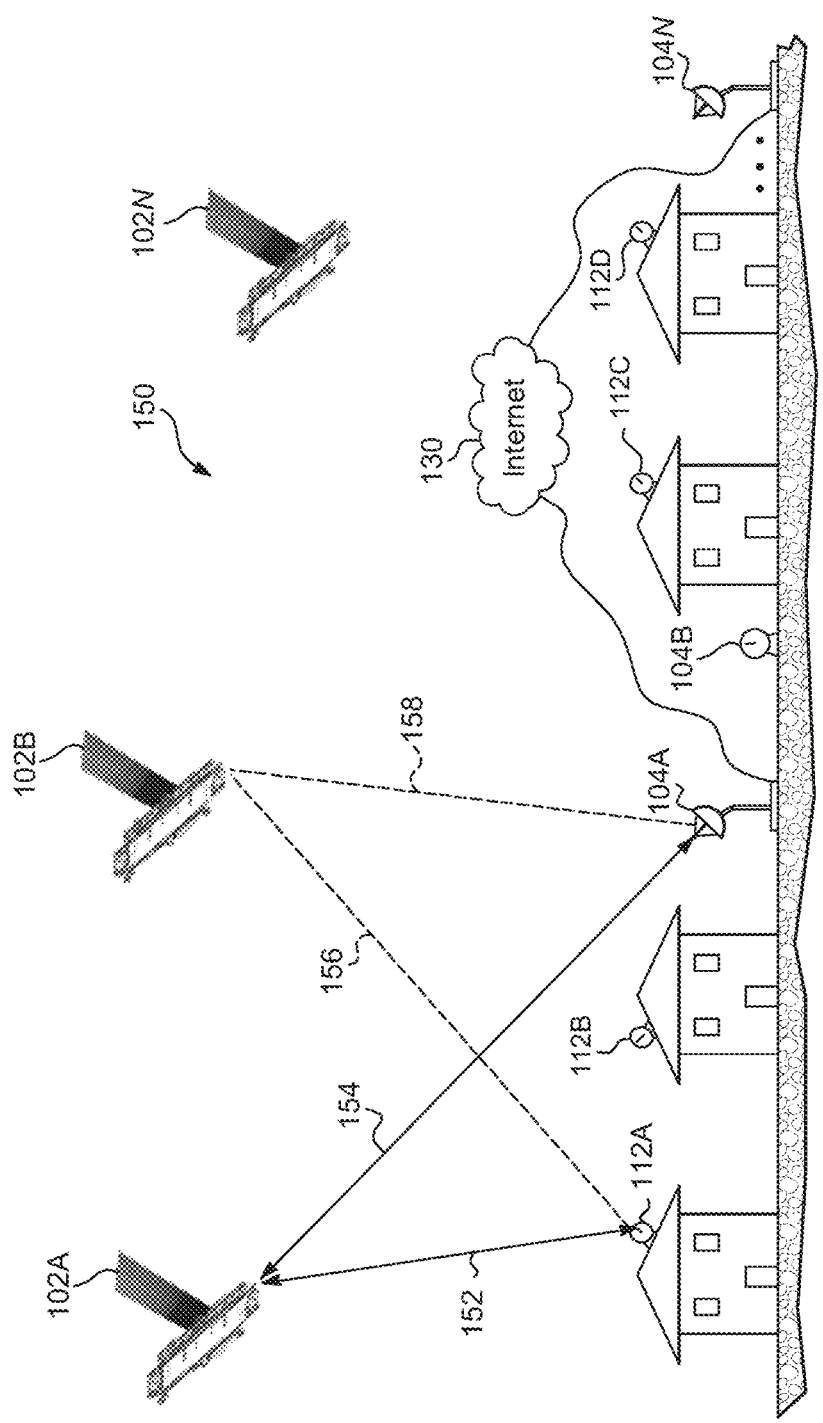
FIG. 1B is a simplified diagram illustrating an example of a satellite-based communications environment, in accordance with some examples of the present disclosure.

FIG. 1B is a diagram illustrating an example of a satellite-based communications environment 150, in accordance with various aspects of the present disclosure. The satellite-based communications environment 150 can include a plurality of SATs 102A-N orbiting Earth in, for example and without limitation, a non-geostationary orbit (NGO) constellation. In this example, three SATs (e.g., SAT 102A, 102B, and 102N) are shown for illustrative purposes. However, one of ordinary skill in the art will recognize that other examples can include more or less SATs than those shown in FIG. 1B.

The satellite-based communications environment 150 includes ground or Earth-based equipment configured to communicate with the SATs 102A-N. In some examples, such equipment can include user terminals (UTs) 112A-N and SAGs 104A-N. Each of the UTs 112A-N can be associated with a particular user. The UTs 112A-N can be configured to serve as a conduit between particular user networks and/or devices (e.g., 114A-N) and at least one of the SATs 102A-N in communication range of the UTs 112A-N, such that the particular user networks and/or device can have access to a network, such as the Internet (e.g., network 130). Each of the UTs 112A-N is particularly positioned in proximity to an associated user network and/or device. For example, each of the UTs 112A-N can be located on a respective user's building's roof, a yard of the user's building, etc. A variety of other locations are also contemplated for the UTs 112A-N.

At any given time, a particular SAT (102A, 102B, 102N) can be in communication with a given UT from the UTs 112A-N to facilitate a link to the network 130. For instance, a user device in proximity to UT 112A (e.g., and connected together via a wireless connection) requests to access the network 130 (e.g., request a web page). UT 112A can establish a communication link 152 to the SAT 102A and transmit the data request. SAT 102A, in response, can establish a communication link 154 with an SAG 104A to relay the data request. The SAG 104A can have a connection (e.g., wired or wireless) to the network 130.

The data associated with the request (e.g., the requested web page) can be returned in the reverse path, from the SAG 104A, communication link 154, SAT 102A, communication link 152, and UT 112A, to the originating user device. If SAT 102A moves out of position relative to UT 112A before the requested data can be provided to the UT 112A (or otherwise becomes unavailable), then SAG 104A can establish a communication pathway 156, 158 with a different SAT, such as SAT 102B, to provide the requested data.

In some aspects, one or more of the SAGs 104A-N can include repeaters that lack a wired connection to the network 130. A repeater can be configured to relay communications to and/or from a SAT that is a different SAT from the one that directly communicates with a UT or gateway. A repeater can be configured to be part of the communication pathway between a UT and gateway. A repeater may be accessed in cases where a SAT does not have access to a gateway, and thus has to send its communication to another SAT that has access to a gateway via the repeater. Repeaters can be located terrestrially, on water (e.g., on ships or buoys), in airspace below satellite altitudes (e.g., on an airplane or balloon), and/or other Earth-based locations. Accordingly, the SAGs 104A-N can also be referred to as Earth-based network nodes, Earth-based communication nodes, and/or the like. In some aspects, transmitter and receiver systems can be included in each UT, SAT, and gateway of the satellite-based communications environment 150.

While the satellite-based communications environment 150 is shown to include certain elements and components, one of ordinary skill will appreciate that the satellite-based communications environment 150 can include more or fewer elements and components than those shown in FIG. 1B. For example, the satellite-based communications environment 150 can include, in some instances, networks, cellular towers, communication hops or pathways, network equipment, and/or other electronic devices that are not shown in FIG. 1B.

Figure 1C:
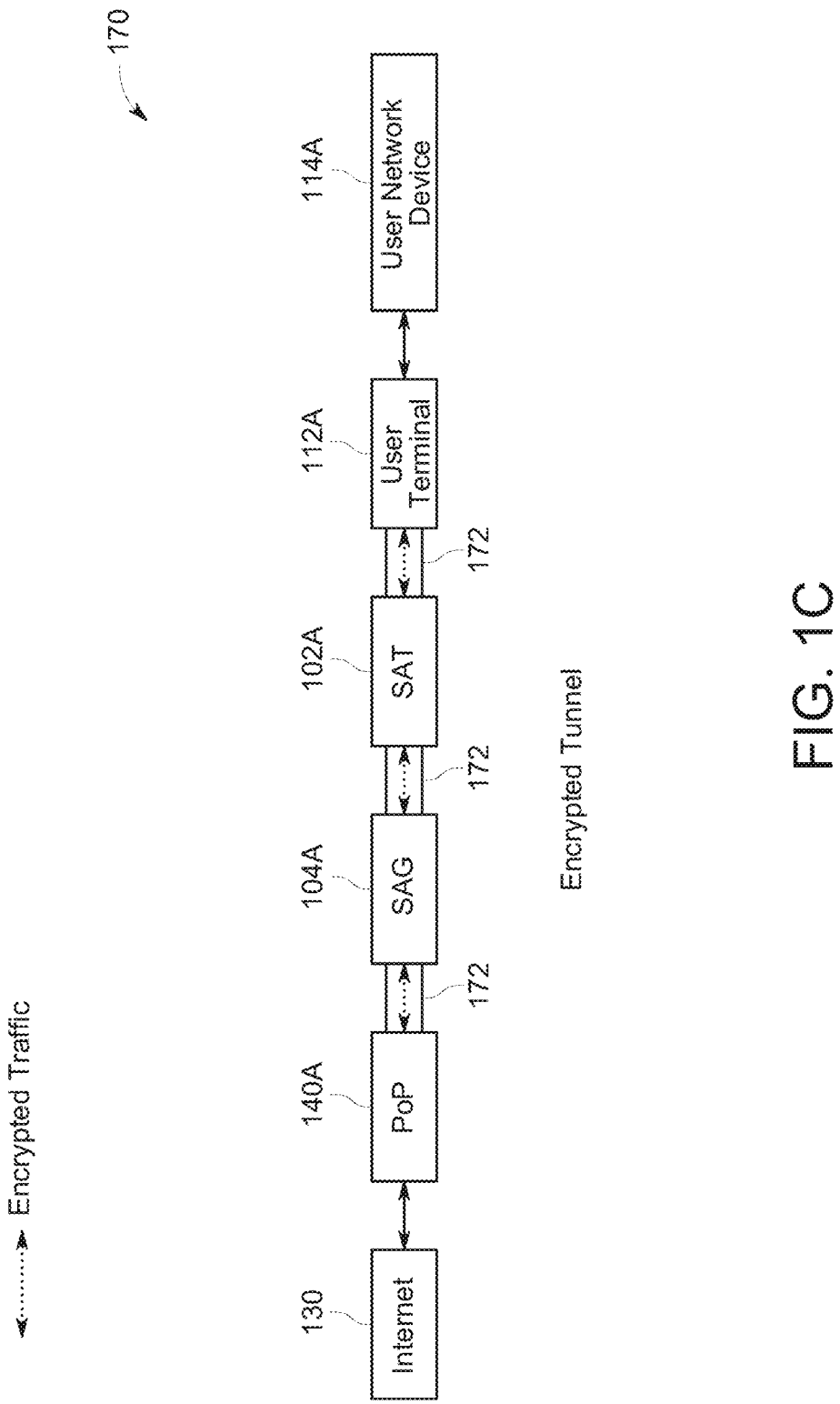
FIG. 1C is a simplified diagram illustrating an example virtual link to the Internet in a satellite-based communication system, in accordance with some examples of the present disclosure.

FIG. 1C is a diagram illustrating an example virtual link 170 to the network 130 in a satellite-based communication system. The virtual link 170 in this example connects a user network device 114A to the network 130. Moreover, the virtual link 170 can include an encrypted tunnel 172 between a user terminal 112A connected to the user network device 114A and a PoP site 140A providing access to the network 130. The encrypted tunnel 172 can encrypt packets communicated between the user terminal 112A and the PoP site 140A for increased privacy and security.

As previously explained, to access the network 130, the user network device 114A can establish a connection with the user terminal 112A, which can communicate with the SAT 102A and ultimately provide access the Internet (e.g., network 130). The user terminal 112A can send packets from the user network device 114A to the SAT 102A through the encrypted tunnel 172. The SAT 102A can forward such packets to the SAG 104A through the encrypted tunnel 172. The SAG 104A can route the packets to the PoP site 140A, which can then route the packets to the network 130 and provide Internet access. Packets from the network 130 to the user network device 114A can similarly travel along each hop in the virtual link 170 (e.g., the PoP site 140A, the SAG 104A, the SAT 102A, and the UT 112A) in the reverse direction.

To route packets between the various components in the virtual link 170, each component can have an assigned routing identifier and/or address (e.g., Internet Protocol (IP) address). The routing identifiers and/or addresses of the various components can be used to make routing decisions, route or forward packets to their destinations, perform path or cost computations, monitor a topology and/or network conditions, identify each hop along a path to a packet destination, etc. In some examples, a routing identifier can include a network label that one or more components in the virtual link 170 can use to identify the hop/component associated with the routing identifier, route/forward packets to that hop/component, and/or many any routing decisions.

Packets communicated between the SAT 102A and the UT 112A can be transmitted within radio frames. Moreover, in some cases, multiple user terminals may share a same radio frame for uplink transmissions to the SAT 102A. The use of radio frames to communicate between satellites and user terminals and the sharing of radio frames by multiple user terminals for uplink transmissions to satellites can significantly complicate wireless and handover services in satellite-based communication systems. However, the approaches herein can provide scheduling, timing, and signal processing techniques to support stable, efficient, and low latency wireless services and handovers.

As referenced herein, a radio frame can represent and/or include a time window for one or more downlink transmissions from a satellite to user terminals, or a time window for one or more uplink transmissions from user terminals to a satellite. A radio frame as referenced herein can also represent and/or include one or more signals and/or data (e.g., one or more radio bursts, packets, etc.) transmitted within the time window for the one or more uplink transmissions or the one or more downlink transmissions. For example, a radio frame can include data transmitted by a satellite to user terminals within a time window associated with the radio frame, or one or more radio bursts received by the satellite from the user terminals within the time window associated with the radio frame.

Figure 2:
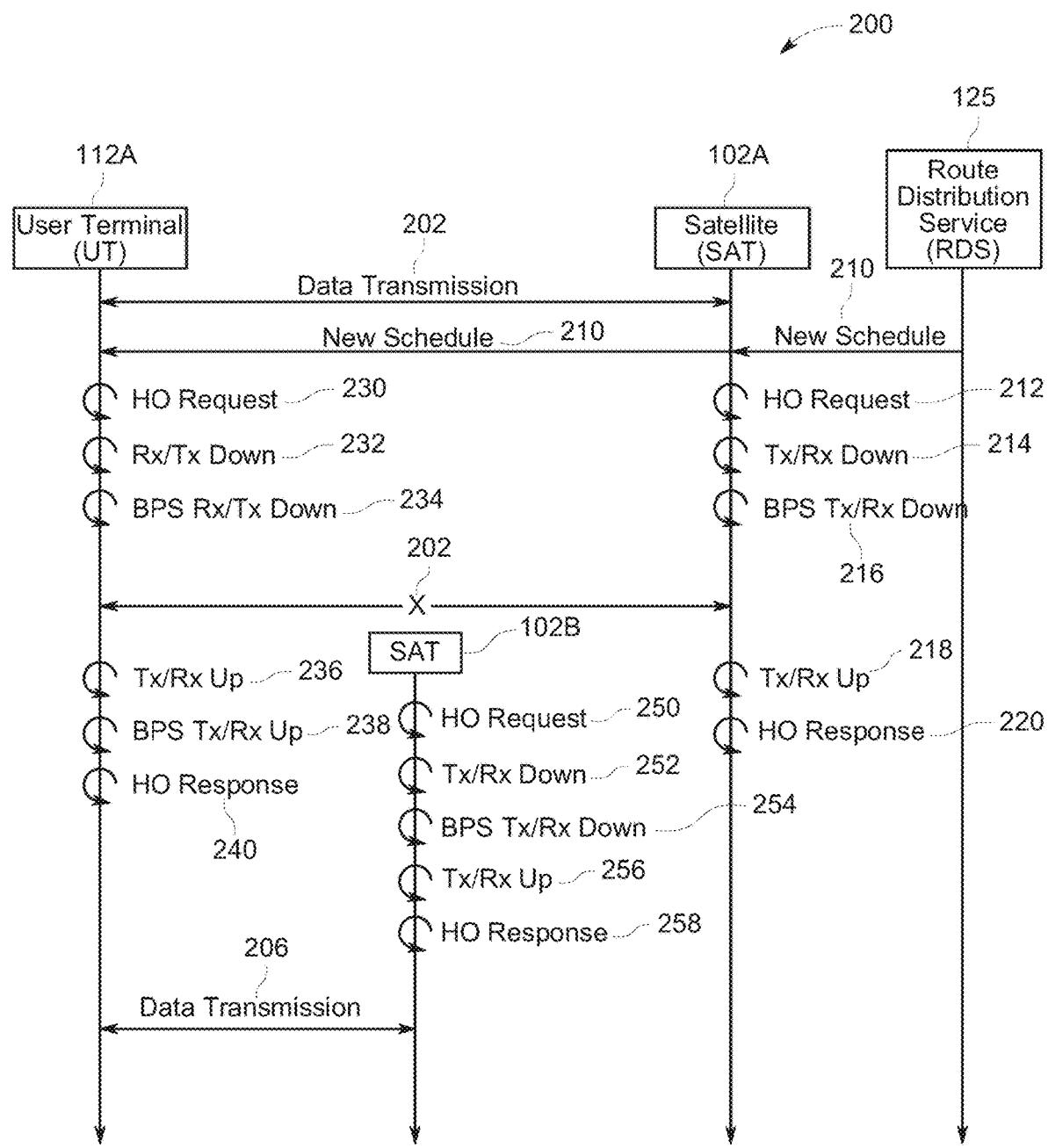
FIG. 2 illustrates an example message flow for a user terminal handover, in accordance with some examples of the present disclosure.

FIG. 2 illustrates an example message flow 200 of a handover for a user terminal in a satellite-based communications environment (e.g., 100, 150, 170). The message flow 200 can be implemented for a user terminal handover on a downlink direction or an uplink direction, as further described below with respect to FIGS. 4 through 8. Moreover, the user terminal handover can be used to serve the user terminal with a different satellite or with a different beam on the same satellite.

In some cases, the user terminal handover can be triggered by a schedule generated in advance, which can (pro-actively) anticipate and/or address a needed change in service to the user terminal from one satellite to a different satellite or from one beam of a satellite to a different beam of the satellite. In some examples, the user terminal handover can be triggered when, or the schedule can trigger the user terminal handover in advance when, a satellite serving a user terminal and/or cell moves outside of a range of the user terminal and/or cell, or experiences signal, connectivity, and/or performance issues. In other examples, the user terminal handover can be triggered by on topology changes or events, load balancing rules/conditions, resource optimization efforts, etc.

As further described herein, the user terminal handover can be based on a schedule generated in advance and provided in advance (e.g., via a control plane) to one or more hops along a link (e.g., SAT 102A, the SAG 104A, the UT 112A, and/or the PoP site 140A in the virtual link 170). Moreover, when performing a handover between a source satellite and a target satellite, packet bicasting can be used to prevent loss of packets between the source satellite and the user terminal. In some examples, time division multiplexing (TDM) can be used when performing a handover involving a satellite serving multiple cells.

In the example message flow 200, a handover is performed to transfer a communication link 202 between SAT 102A and UT 112A to SAT 102B, and establish a new communication link 206 between SAT 102B and UT 112A. Prior to the handover, the UT 112A and the SAT 102A can receive (e.g., via a connection manager (CM) as further described below) a schedule 210 from an entity in the network and/or network control plane such as route distribution service (RDS) 125. For example, the SAT 102A can receive one or more schedules (e.g., 210) from RDS 125, keep a copy of the one or more schedules and send another copy of the one or more schedules to the UT 112A. In some cases, the UT 112A and the SAT 102A can directly or indirectly receive the schedule 210 from RDS 125 in advance (e.g., prior to the handover). Moreover, in some examples, the UT 112A (and a CM on the SAT 102A) can periodically fetch a new schedule from RDS 125.

The schedule 210 can define what entities should communicate with what other entities, when certain entities should communicate with certain other entities, etc. For example, the schedule 210 can indicate that UT 112A should communicate with SAT 102B and/or that SAT 102A should not communicate with UT 112A, and can define one or more time slots and/or radio frames in which UT 112A (and any other UTs) and SAT 102B should communicate with each other. In some cases, the schedule 210 can indicate that SAT 102B should communicate with one or more UTs in one or more cells (e.g., cell 110A, cell 110/V), including UT 112A, and can define one or more time slots and/or radio frames for one or more communications between the SAT 102B and the one or more UTs. The UT 112A and the SAT 102A can accordingly initiate the handover to perform a handover and establish the new communication link 206 between the UT 112A and the SAT 102B. In some cases, the schedule 210 can indicate which SAT, SAG, UT, and/or PoP site should be included in, or part of, a communication link and/or communication session between a UT and a SAT. In some cases, the schedule 210 can also indicate one or more time slots to the SAT, SAG, UT, and/or Pop site to communicate in.

Based on the schedule 210, the UT 112A can process a handover (HO) request 230 to initiate a handover from SAT 102A to SAT 102B. For example, the UT 112A can generate the handover request 230 (e.g., via a CM) which can be processed by layer 2 or L2 (e.g., via the upper media access control (UMAC) layer of the MAC L2 sub-layer) at the UT 112A. Similarly, the SAT 102A can process a handover request 212 to initiate the handover from SAT 102A to SAT 102B. For example, the SAT 102A can generate the handover request 212 (e.g., via a CM) which can be processed at L2 of the SAT 102A (e.g., via the UMAC layer of the MAC L2 sub-layer). The handover requests 212 and 230 can request a handover from SAT 102A to SAT 102B to establish the new communication link 206 between the UT 112A and the SAT 102B. In some examples, the new communication link 206 can be established in the handover by transferring the communication link 202 from the UT 112A and the SAT 102A to the UT 112A and the SAT 102B.

In some cases, the handover request 230 from the UT 112A can include a new session identifier (SID), a time and/or time slot for the handover, and/or an indication that the UT 112A is requesting a handover. In some examples, the SID can identify a communication session service, flow, and/or destination corresponding to transmissions between the UT 112A and the destination system that will serve the UT 112A after the handover, which in this example is SAT 102B. In some cases, the SID can also identify a service, flow, and/or destination corresponding to the communication session. In some examples, the indication that the UT 112A is requesting a handover can include one or more flags or bits identifying the handover. The UT 112A can switch SIDs from a current SID associated with the SAT 102A and/or communications with the SAT 102A, to the new SID in the handover request 230.

Moreover, in some cases, the handover request 212 from the SAT 102A can include a new cell identifier for the handover, a group of SIDs corresponding to flows/UTs associated with a cell corresponding to the new cell identifier, a time and/or time slot for a given beam from the SAT 102A, and an indication of the handover being requested.

At the UT 112A, after the handover request 230 and prior to the handover, the UT 112A can initiate an Rx/Tx takedown process 232 to bring down the Rx and Tx connections/interfaces at the MAC L2 sub-layer and L1 layer (e.g., the physical layer). The UT 112A can also issue an Rx/Tx beam pointing service (BPS) down command 234 (e.g., via a BPS component) to bring down Rx and Tx beam-pointing operations at the UT 112A.

Similarly, at the SAT 102A, after the handover request 212 and prior to the handover, the SAT 102A can initiate a Tx/Rx takedown process 214 to bring down the Tx and Rx connections/interfaces at the MAC L2 sub-layer and the L1 layer. The SAT 102A can also issue (e.g., via L1 layer) a Tx/Rx BPS down command 216 (e.g., to a BPS component) to bring down Tx and Rx beam-pointing operations at the SAT 102A. In some examples, the SAT 102A can clear a MAC buffer after the Tx takedown and/or the Rx takedown at L2 to clear the buffer on the SAT 102A.

After the various Rx and Tx takedown operations at the UT 112A and the SAT 102A, the communication link 202 between the UT 112A and the SAT 102A is terminated. The UT 112A can perform a Tx/Rx up process 236 to bring up Rx and Tx at the L2 and L1 layers in preparation for the handover. The UT 112A (e.g., via L1 layer) can also issue a BPS Tx/Rx up command 238 to (e.g., to a BPS at the UT 112A), and generate/provide a handover response 240 (e.g., from L2 to the CM). The handover response 240 can indicate that the UT 112A is ready for, and/or has enabled, a handover to the SAT 102B. Alternatively, the handover response 240 can indicate if any errors or failures occurred that may prevent the handover from successfully occurring.

The SAT 102A can similarly perform a Tx/Rx up process 218 (e.g., via L2 and L1) to bring up or enable Tx and Rx components/interfaces at the SAT 102A. The SAT 102A can generate/provide (e.g., from L2 to the CM) a handover response 220 once the Tx/Rx components/interfaces are up at the SAT 102A (e.g., at the MAC and physical layers).

To establish the new communication link 206 for the handover, the SAT 102B can generate/provide (e.g., from a CM to L2) a handover request 250 to perform the handover and establish the new communication link 206. The SAT 102B can perform a Tx/Rx takedown process 252 to bring down the Tx and Rx connections/interfaces at L2 and L1. The SAT 102B can also generate (e.g., via L1) a BPS Tx takedown command 254 to stop beam pointing at the SAT 102B. In some examples, the SAT 102B can clear a MAC buffer after the Tx and/or Rx takedown at L2 to clear the buffer on the SAT 102B.

The SAT 102B can perform a Tx/Rx up process 256 to enable the Tx and Rx connections/interfaces at L2 and L1 for transmitting and receiving data to and from the UT 112A. The SAT 102B can then generate/provide a handover response 258 (e.g., from L2 to a CM at the SAT 102B) to finalize the handover and establish the new communication link 206 with the UT 112A. The UT 112A and SAT 102B can seamlessly establish the new communication link 206 and the UT 112A can continue satellite communications via the new communication link 206 with the SAT 102B.

Figure 3A:
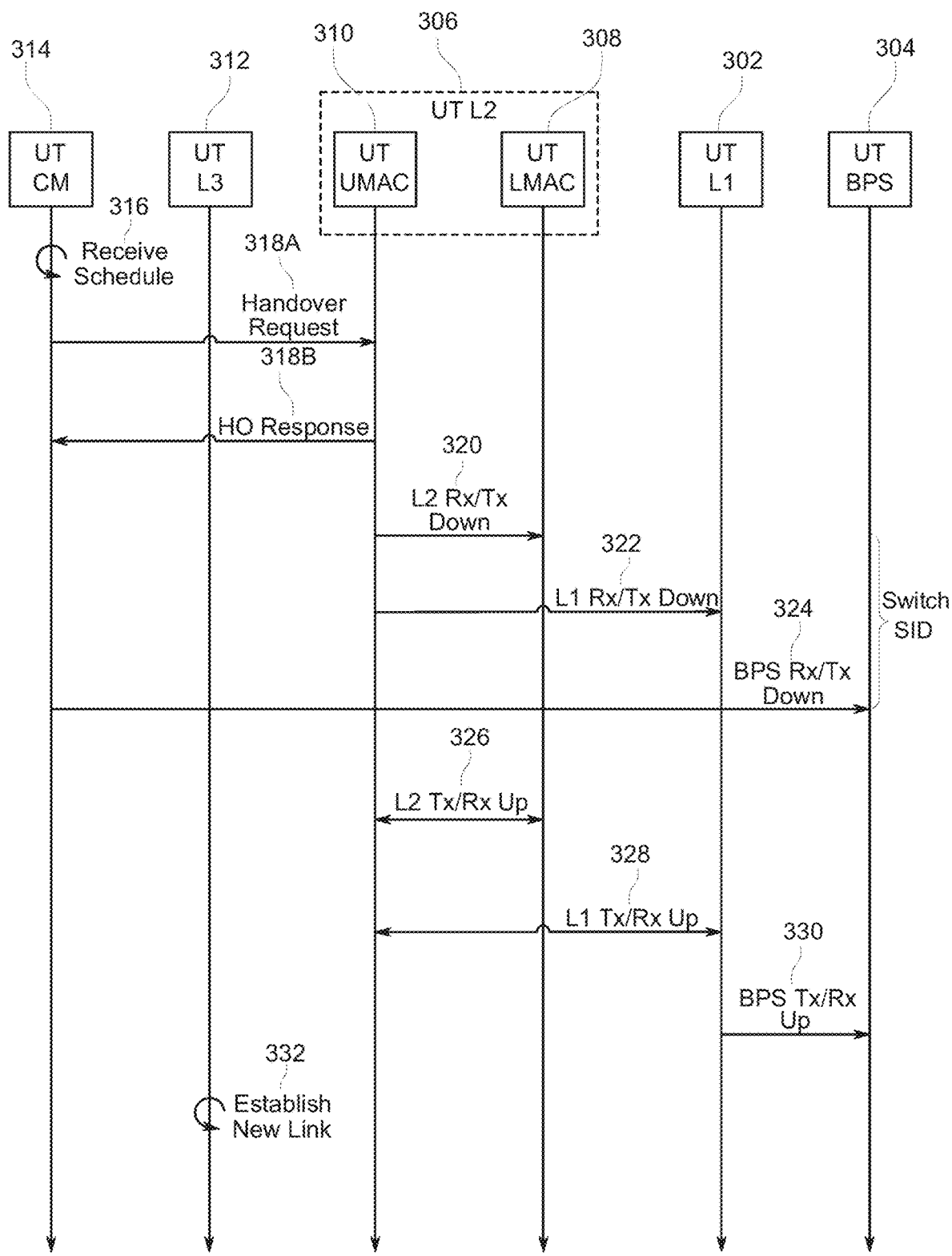
FIG. 3A illustrates an example message flow performed by a user terminal for a handover, in accordance with some examples of the present disclosure.

FIG. 3A is a diagram illustrating an example UT message flow 300 at UT 112A for the handover from the message flow 200 shown in FIG. 2. In the example UT message flow 300, prior to the handover, a CM 314 at UT 112A can receive 316 a schedule (e.g., 210) from SAT 102A for one or more communications and/or handovers in the satellite-based environment (e.g., 100). In some examples, the SAT 102A can receive the schedule from RDS 125 and provide a copy of the schedule to the UT 112A. The CM 314 can be a component that interfaces with the L2 layer 306 at UT 112A to initiate and/or manage handovers. In some cases, the CM 314 can receive the schedule from the SAT 102A in advance (e.g., prior to the handover being initiated, needed, ready to be initiated, etc.), in anticipation of a future or upcoming need to perform the handover, and/or prior to one or more scheduled communications and/or handovers. Moreover, in some examples, the CM 314 can periodically fetch a new schedule from the SAT 102A.

As previously noted, the schedule can define what entities should communicate with what other entities, when certain entities should communicate with certain other entities, when a handover should be initiated or performed, etc. For example, the schedule can indicate that UT 112A should communicate with SAT 102B and can define one or more time slots and/or radio frames in which UT 112A should communicate with SAT 102B. The UT 112A and the SAT 102A can accordingly initiate the handover to perform a handover and establish the new communication link between the UT 112A and the SAT 102B. In some cases, the schedule can indicate which SAT, SAG, UT, and/or PoP site should be included in, or part of, a communication link and/or communication session between a UT and a SAT. In some cases, the schedule can also indicate one or more time slots for the SAT, SAG, UT, and/or Pop site to communicate in. In some examples, the RDS 125 can generate the schedule and send the schedule individually to one or more SATs, one or more SAGs, one or more UTs, and/or one or more PoP sites via the control plane.

For example, the RDS 125 can generate the schedule and individually send the schedule individually (e.g., via the control plane) to UT 112A, a current SAT serving UT 112A (e.g., SAT 102A), a target SAT that should serve UT 112A after a handover (e.g., SAT 102N), a current SAG (e.g., SAG 104A) used by the current SAT serving UT 112A, a target SAG (e.g., SAG 104N) that should be used by the current SAT and/or the target SAT after the handover, a current PoP site (e.g., 140A) used for a current communication session, a target PoP site (e.g., 140N) that should be used for a subsequent communication session (e.g., the new communication link 206 used after the handover), and/or any other device. In other examples, the RDS 125 can generate the schedule for distribution to one or more SATs, SAGs, UTs, and/or PoP sites, and send the schedule to one or more devices, such as a SAT, which can then distribute the schedule to the remaining devices that should receive the schedule, such as the one or more SAGs, UTs, and/or PoP sites.

The CM 314 on the UT 112A can receive the schedule and, based on the schedule, the CM 314 can send a handover request 318A to the upper media access control (UMAC) layer 310 of the MAC sub-layer of the L2 layer 306 at UT 112A. The handover request 318A can request a handover from SAT 102A to SAT 102B to establish the new communication link between the UT 112A and the SAT 102B. In some examples, the new communication link can be established through the handover by transferring a current communication link from the UT 112A and the SAT 102A to the UT 112A and the SAT 102B.

In some cases, the handover request 318A from the CM 314 on the UT 112A can include a new SID, a time and/or time slot for the handover, and/or an indication that the UT 112A is requesting a handover. In some examples, the SID can identify a service, flow, and/or destination corresponding to transmissions between the UT 112A and the destination system that will serve the UT 112A after the handover, which in this example is SAT 102B. In some examples, the indication that the UT 112A is requesting a handover can include one or more flags or bits identifying the handover. In some examples, the UT 112A can switch SIDs from a current SID associated with the SAT 102A and/or communications with the SAT 102A, to the new SID in the handover request 318A.

In response to the handover request 318A, the UMAC sub-layer 310 can send a handover response 318B to the CM 314. The handover response 318B can indicate that the UT 112A is ready for a handover to the SAT 102B. Prior to the handover, the UMAC sub-layer 310 can send an L2 Rx/Tx down command 320 to the lower MAC (LMAC) sub-layer 308 to initiate an L2 Rx/Tx takedown process to bring down the Rx and Tx connections at the L2 layer 306 (e.g., at the MAC sublayer). The UMAC sub-layer 310 can also send an L1 Rx/Tx down command 322 to the L1 layer (e.g., the physical layer) 302 to initiate an L1 Rx/Tx takedown process to bring down the Rx and Tx interfaces at the L1 layer 302. In some examples, the L2 Rx/Tx down command 320 which the LMAC sub-layer 308 can use when bringing down the L2 Rx/Tx connections. Similarly, in some examples, the L1 Rx/Tx down command 322 can include timing information, which the L1 layer 302 can use to when bringing down the L1 Rx/Tx interfaces.

The CM 314 can send an Rx/Tx BPS down command 324 to a BPS 304 at the UT 112A to bring down Rx and Tx beam-pointing operations at the UT 112A. In some examples, the Rx/Tx BPS down command 324 can include timing information that the BPS 304 can use to bring down the Rx and Tx beam-pointing operations. In some cases, the Rx/Tx BPS down command 324 can include an indication of a new beam pointing direction/angle for the new communication link with SAT 102B.

After the various Rx and Tx takedown operations at the UT 112A, the connection between the UT 112A and the SAT 102A is terminated. The LMAC sub-layer 308 and the UMAC sub-layer 310 at the UT 112A can perform a L2 Rx/Tx up process 326 to bring up Rx and Tx at the L2 layer 306 in preparation for the handover. The UMAC sub-layer 310 and the L1 layer 302 can also perform a L1 Tx/Rx up process 328 to bring up the Tx and Rx interfaces at the physical layer (e.g., L1 layer 302). The CM 314 can send a BPS Tx/Rx up command 330 to the BPS 304, and the L3 layer 312 can establish 332 the communication link with the SAT 102B. In some cases, the UT 112A can generate an error/failure notification message if any errors or failures occurred that may prevent the handover from successfully occurring.

Figure 3B:
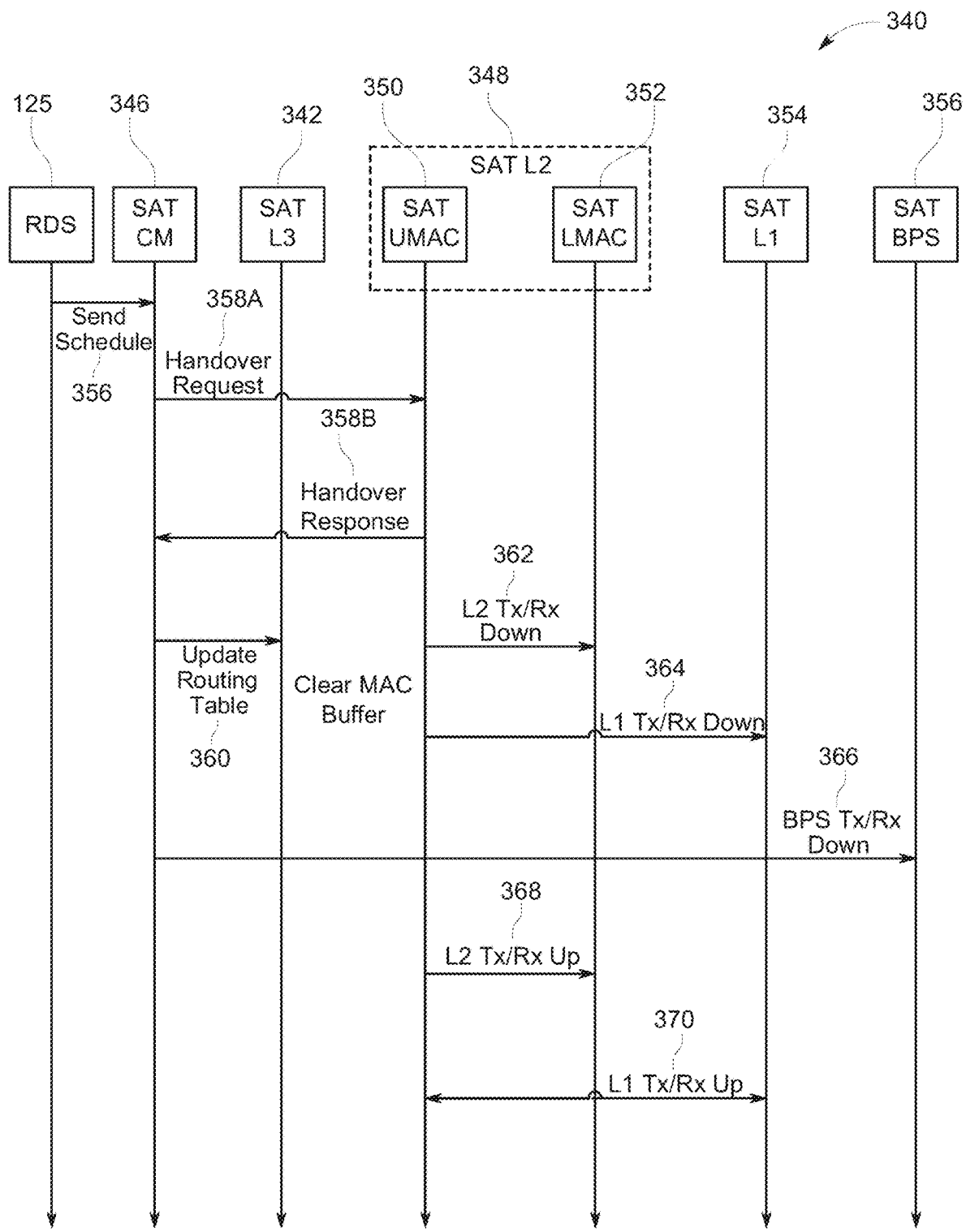
FIGS. 3B and 3C illustrate example message flows performed by satellites for a handover, in accordance with some examples of the present disclosure.

During the UT message flow 300 of the handover at layers 1, 2, and 3 of the UT 112A, the SATs 102A and 102B can also perform respective SAT message flows for establishing the handover. FIG. 3B illustrates an example SAT message flow 340 at SAT 102A for the handover described in the message flow 200 shown in FIG. 2.

In the example message flow 340, prior to the handover, the RDS 125 can send 356 anew schedule (e.g., 210) to the CM 346 at SAT 102A. As previously noted, in some examples, the RDS 125 can be a network topology service that manages, maintains, collects, and/or propagates topology and/or scheduling information for devices and/or communications in the satellite-based environment (e.g., 100). In some cases, the RDS 125 can send the schedule to the SAT 102A in advance. Moreover, in some examples, the CM 346 can periodically fetch a new schedule from the RDS 125.

As previously explained, the schedule can define what entities should communicate with what other entities, when certain entities should communicate with certain other entities, etc. For example, the schedule can indicate that the SAT 102A should perform a handover with SAT 102B, and that UT 112A should communicate with SAT 102B. The schedule can also define one or more time slots and/or radio frames in which UT 112A should communicate with SAT 102B. The UT 112A and the SAT 102A can accordingly initiate the handover to perform the handover and transfer a current connection between SAT 102A and UT 112A to SAT 102B so UT 112A can continue to communicate through SAT 102B.

Based on the schedule, the CM 346 on the SAT 102A can send a handover request 358A to the UMAC layer 350 of the L2 layer 348 (e.g., the MAC sub-layer) on the SAT 102A. The handover request 358A can request a handover from SAT 102A to SAT 102B to establish a new communication link between the UT 112A and the SAT 102B. In some examples, the new communication link can be established in the handover by transferring a current communication link from the UT 112A and the SAT 102A to the UT 112A and the SAT 102B.

In some cases, the handover request 358A from the CM 346 on the SAT 102A can include a new cell identifier for the handover, a group of SIDs corresponding to UT sessions associated with one or more UTs in a cell corresponding to the new cell identifier, a time and/or time slot for a given beam from the SAT 102A, and/or an indication of the handover being requested. The UMAC sub-layer 350 can send a handover response 358B to the CM 346 indicating that the SAT 102A is ready for the handover. In some cases, the UMAC sub-layer 350 can send the handover response 358B after the handover request 358A and before the handover has completed. In other cases, the UMAC sub-layer 350 can send the handover response 358B (or an additional handover response) once the Tx/Rx components/interfaces are up/enabled at the MAC and physical layers and/or the handover operations at the SAT 102A are complete.

Prior to the handover, the CM 346 can send a routing table update 360 to the L3 Layer 342 to update the routing table at the SAT 102A. The routing table update 360 can add, edit, and/or remove routes and/or L3 addresses. For example, the routing table update 360 can remove routes and/or addresses associated with the UT 112A, add or remove routes and/or addresses associated with SAT 102B, add or remove routes associated with the current communication link between SAT 102A and UT 112A, etc.

Moreover, prior to the handover, the UMAC sub-layer 350 can send a L2 Tx/Rx down command 362 to the LMAC sub-layer 352 to initiate a L2 Tx/Rx takedown process to bring down the Tx and Rx connections at the MAC L2 sub-layer 348. In some cases, the UMAC sub-layer 350 can send a single L2 Tx and Rx down message/command to the LMAC sub-layer 352. In other cases, the UMAC sub-layer 350 can send a L2 Tx down command/message and a separate Rx down command/message to the LMAC sub-layer 352. In some examples, the SAT 102A can clear a MAC buffer after the L2 Tx/Rx takedown (or the L2 Tx/Rx down command 362) to clear the buffer on the SAT 102A.

The UMAC sub-layer 350 can send a L1 Tx/Rx down command 364 to the L1 layer 354 to initiate a L1 Tx and Rx takedown process to bring down the Tx and Rx interfaces at the L1 layer 354. In some cases, the UMAC sub-layer 350 can send a single L1 Tx/Rx down command/message to the L1 layer 354. In other cases, the UMAC sub-layer 350 can send a L1 Tx down command/message and a separate L1 Rx down command/message to the L1 layer 354. The CM 346 can then send a Tx/Rx BPS down command 366 to BPS 356 to bring down Tx and Rx beam-pointing operations at the SAT 102A. In some examples, the Tx/Rx BPS down command 366 can include new beam pointing information (e.g., time, angle, direction, etc.). In some cases, the CM 346 can send a single Tx and Rx BPS down message/command to the BPS 356. In other cases, the CM 346 can send a Tx BPS down message/command and a separate Rx BPS down message/command.

In some examples, after the various Rx and Tx takedown operations at the SAT 102A, the communication link between the UT 112A and the SAT 102A can be temporarily or permanently disabled, deactivated, reset, terminated, paused, etc. The LMAC sub-layer 352 and UMAC sub-layer 350 can perform a L2 Tx/Rx up process 368 and the UMAC sub-layer 350 and the L1 layer 354 can perform a L1 Tx/Rx up process 370 to bring up or enable Tx and Rx components/interfaces at the MAC (e.g., at L2) and physical (e.g., at L1) layers. In some cases, if the handover has failed, the SAT 102A can generate a message/notification indicating that the handover has failed and/or providing reasons why the handover failed.

Figure 3C:
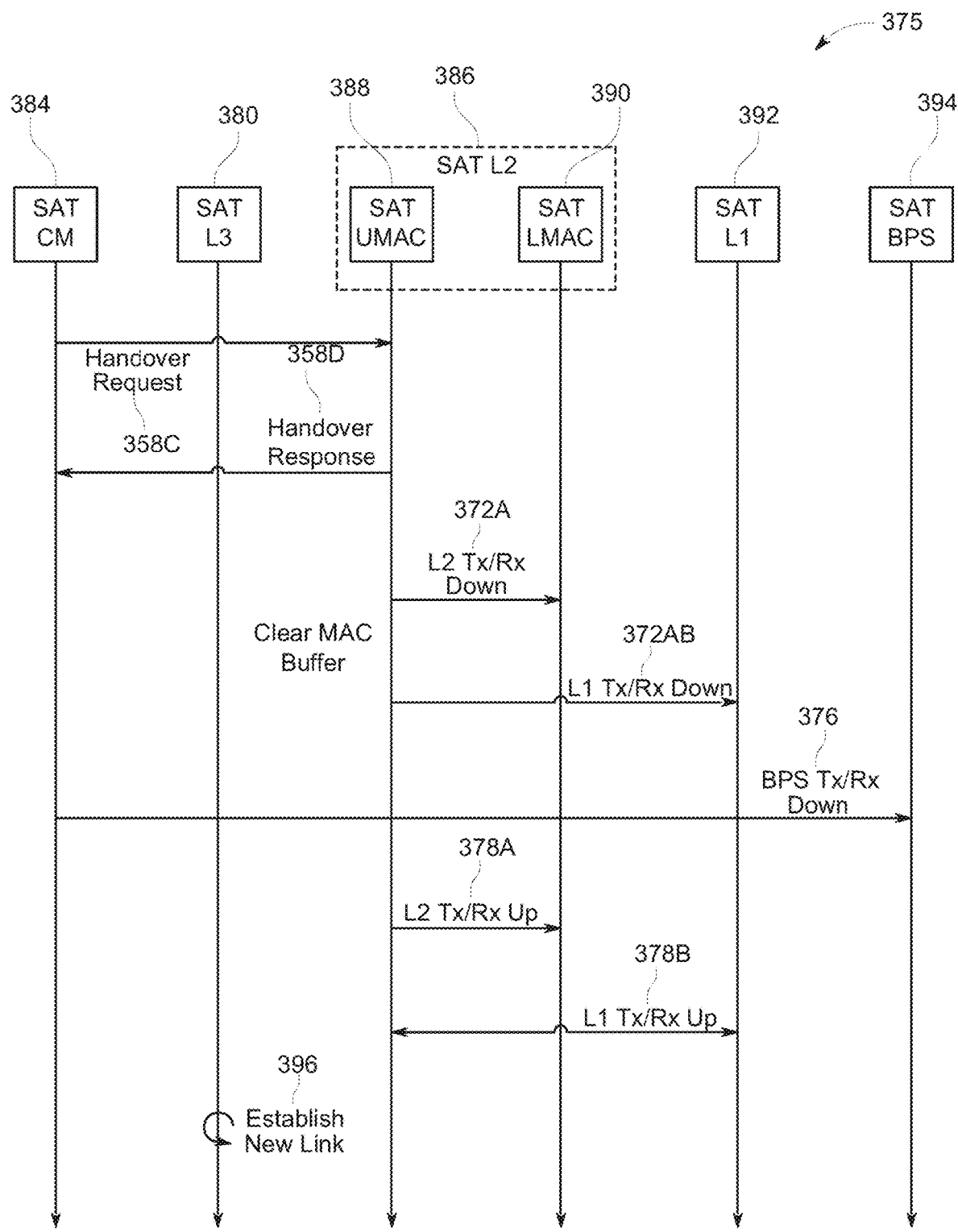

FIG. 3C is a diagram illustrating an example SAT message flow 375 at SAT 102B for the handover described in the message flow 200 shown in FIG. 2. In the example message flow 375, the CM 384 on the SAT 102B can send a handover request 358C to the UMAC sub-layer 388 of the L2 layer 386 (e.g., the MAC sub-layer) on the SAT 102B. The handover request 358C can request a handover between SAT 102B and SAT 102A to establish a new communication link between the UT 112A and the SAT 102B.

In some cases, the handover request 358C from the CM 346 on the SAT 102B can include a cell identifier for the handover, a group of SIDs corresponding to UT sessions associated with one or more UTs in a cell corresponding to the cell identifier, a time and/or time slot for a given beam from the SAT 102B, and/or an indication of the handover being requested.

The UMAC sub-layer 388 can send a handover response 358D to the CM 384 indicating that the SAT 102A is ready for the handover. In some cases, the UMAC sub-layer 388 can send the handover response 358D after the handover request 358C and before the handover has completed. In other cases, the UMAC sub-layer 388 can send the handover response 358D (or an additional handover response) once the Tx/Rx components/interfaces are up/enabled at the MAC and physical layers and/or the handover operations at the SAT 102B are complete.

Prior to the handover, the UMAC sub-layer 388 can send a L2 Tx/Rx down command 372A to the LMAC sub-layer 390 to initiate a L2 Tx/Rx takedown process to bring down the Tx and Rx connections at the L2 layer 386 (e.g., at the MAC sub-layer). The UMAC sub-layer 388 can send the L2 Tx/Rx down command 372A as a single message/command instructing the LMAC sub-layer 390 to bring down the Tx and Rx connections, or can send separate L2 Tx and Rx down commands/messages instructing the LMAC sub-layer 390 to bring down the Rx and Rx connections. In some examples, the SAT 102B can flush a MAC buffer after the L2 Tx takedown and/or the L2 Rx takedown (or after the L2 Tx/Rx down command 372A) to clear the buffer on the SAT 102B.

The UMAC sub-layer 388 can send a L1 Tx/Rx down command 372B to the L1 layer 392 to initiate a L1 Tx/Rx takedown process to bring down the Tx and Rx interfaces at the L1 layer 392. The UMAC sub-layer 388 can send the L1 Tx/Rx down command 372B as a single message/command instructing the L1 layer 392 to bring down the Tx and Rx interfaces at the L1 layer 392, or can send separate L1 Tx and Rx down commands/messages instructing the L1 layer 392 to bring down the Rx and Rx interfaces. The CM 384 can send a Tx/Rx BPS down command 376 to BPS 394 to bring down Tx and Rx beam-pointing operations at the SAT 102B. In some cases, the CM 384 can send a single message/command to bring down Tx and Rx beam-pointing operations, or can send separate Tx and Rx commands/messages to bring down the Tx and Rx beam-pointing operations. In some examples, the Tx/Rx BPS down command 376 can include beam pointing information (e.g., time, direction, angle, etc.).

After the various Rx and Tx takedown operations at the SAT 102B, the LMAC sub-layer 390 and UMAC sub-layer 388 can perform a L2 Tx/Rx up process 3378A and the UMAC sub-layer 388 and the L1 layer 392 can perform a L1 Tx/Rx up process 378B to bring up or enable Tx and Rx components/interfaces at the MAC (e.g., at L2) and physical (e.g., at L1) layers. At this stage, the SAT 102B can establish 396 the communication link with the UT 112A. Alternatively, in some cases, if the handover has failed, the SAT 102B can generate a message/notification indicating that the handover has failed and/or providing reasons why the handover failed.

Figure 4:
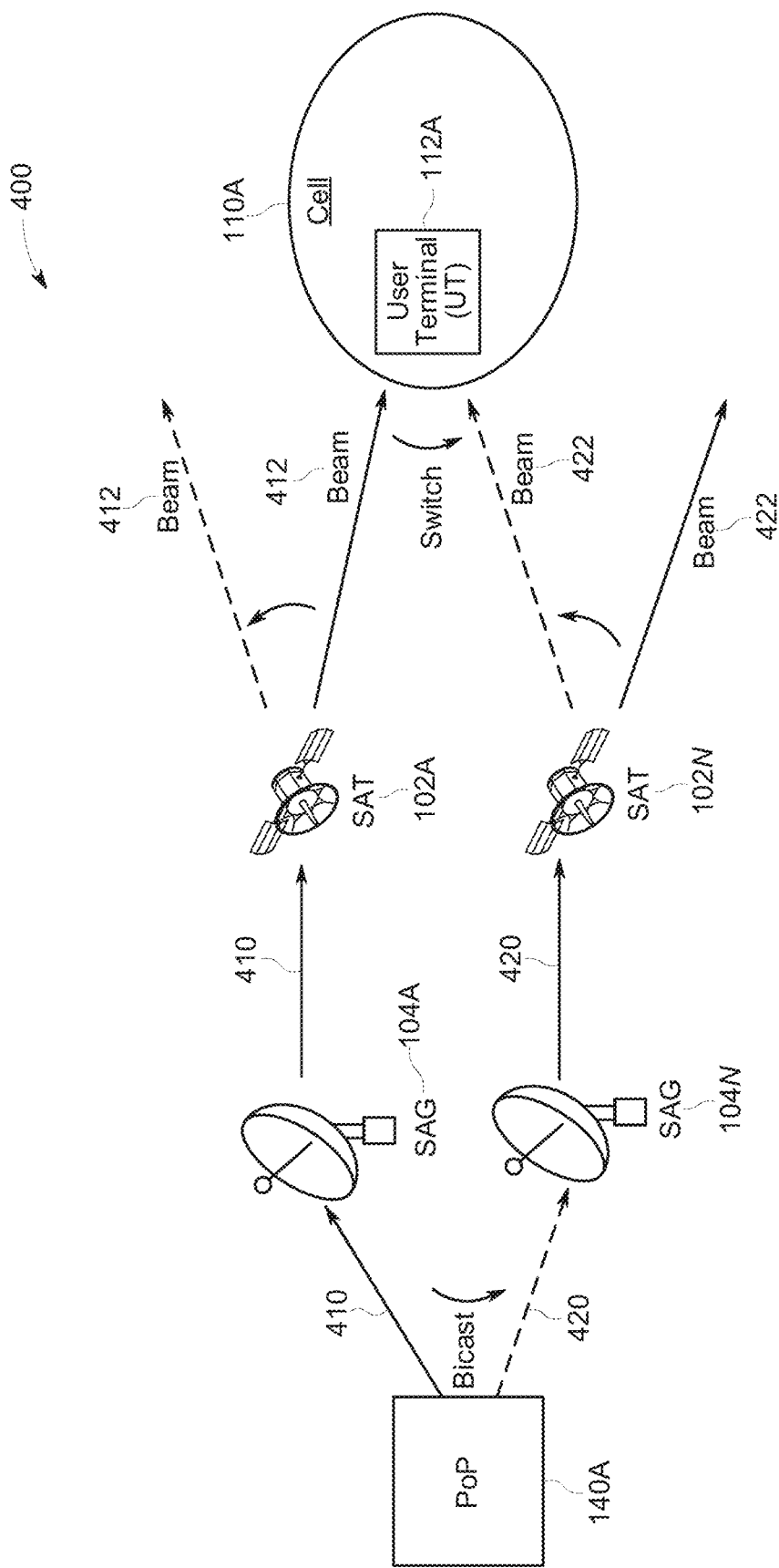
FIG. 4 is a diagram illustrating an example user terminal downlink handover between different satellites, in accordance with some examples of the present disclosure.

FIG. 4 is a diagram illustrating an example UT downlink handover 400 between different SATs 102A and 102N. In this example, SAT 102A currently serves the cell 110A and UT 112A in the cell 110A. The UT downlink handover 400 has been triggered to transfer service to the cell 110A and UT 112A from SAT 102A to SAT 102N. In some examples, the UT downlink handover 400 can be triggered based on a new schedule (e.g., 210) fetched from a distribution service (e.g., 344).

In this example, a current communication path between the UT 112A and the SAT 102A includes path 410 from PoP site 140A to SAT 102A, which includes the PoP site 140A, the SAG 104A and the SAT 102A. Packets from the SAT 102A to the cell 110A and UT 112A are communicated via beam 412. The cell 110A/UT 112A, SAT 102A, and SAT 102N can perform a handover where service by the SAT 102A to the cell 110A and UT 112A is transferred from the SAT 102A to the SAT 102N. For the handover, a new path 420 from PoP site 140A to SAT 102N can be established. The new path 420 can include the PoP site 140A, the SAG 104N and the SAT 102N. Packets from the SAT 102N to the cell 110A and UT 112A are communicated via beam 422.

To prevent packet loss before, during, and/or after the handover, packets transmitted to the cell 110A and UT 112A can be bicasted over the path 410 and beam 412 and the new path 420 and beam 422. In some cases, before the handover, packets can be bicasted and sent over the new path 420 (e.g., PoP site 140A, SAG 104N, and SAT 102/V). After the handover, the packets can be sent by beam 422 to cell 110A and UT 112A again when the same packets transmitted over the path 410 and beam 412 are estimated to still reach the cell 110A and UT 112A, within a certain threshold of confidence. Moreover, in some cases, packets may no longer be sent to the cell 110A and UT 112A over the path 410 and beam 412 when it is determined within a certain threshold of confidence that such packets will not reach the cell 110A and UT 112A.

In some cases, before the handover from the SAT 102A to the SAT 102N, the SAT 102N can buffer any packets on the beam 422 (and/or destined to or associated with the cell 110A and UT 112A), and can discard such packets after the handover is complete. After the handover from the SAT 102A to the SAT 102N, the SAT 102A can similarly discard any packets on the beam 412 that are destined to, and/or associated with, the cell 110A and UT 112A. In some cases, before a subsequent handover to serve a different cell and/or UT(s) with the beam 412, the SAT 102A can buffer any packets associated with the subsequent handover.

In some examples, bicasted packets can include an indication that such packets should not be discarded during the handover. For example, the bicasted packets can include a bit flip associated with the SID associated with the packets to ensure such packets are not discarded. In some cases, the L3 layer 342 of the SAT 102A and/or the L3 layer 380 of the SAT 102N can perform 1-bit flipping in the SID of the packets, and the MAC sub layer of the SAT 102A can check for 1-bit flipping to determine whether to buffer any packets targeting the cell 110A and/or UT 112A after the handover (and/or before the handover), and prevent such packets from being discarded before and/or during the handover. Moreover, the L3 layer at SAT 102A and/or SAT 102N can include or maintain old and new routing tables before and after the handover and/or when routing packets during (and/or associated with) the bicasting. After the MAC sublayer at the SAT 102A has performed a L1 and L2 Tx/Rx takedown, the MAC sub-layer can discard any packets on the beam 412 and/or destined to the cell 110A and UT 112A.

In some cases, the UT 112A may receive duplicate packets from the bicasting. Accordingly, the UT 112A can perform a check for duplicate packets and deduplicate any duplicate packets it received from the SAT 102A and the SAT 102B. In some examples, the UT 112A can compare one or more bits, sequence numbers, flags, parameters, and/or header information in packets to determine if the packets are duplicate packets. The UT 112A can discard any duplicate packets and retain a copy of any duplicate packets. In other examples, the UT 112A can deduplicate packets by comparing a hash or signature of one or more portions of the packets, and determine that packets are duplicates if the comparison yields a match. In other examples, the UT 112A can use any other deduplication strategy to identify duplicate packets.

Figure 5:
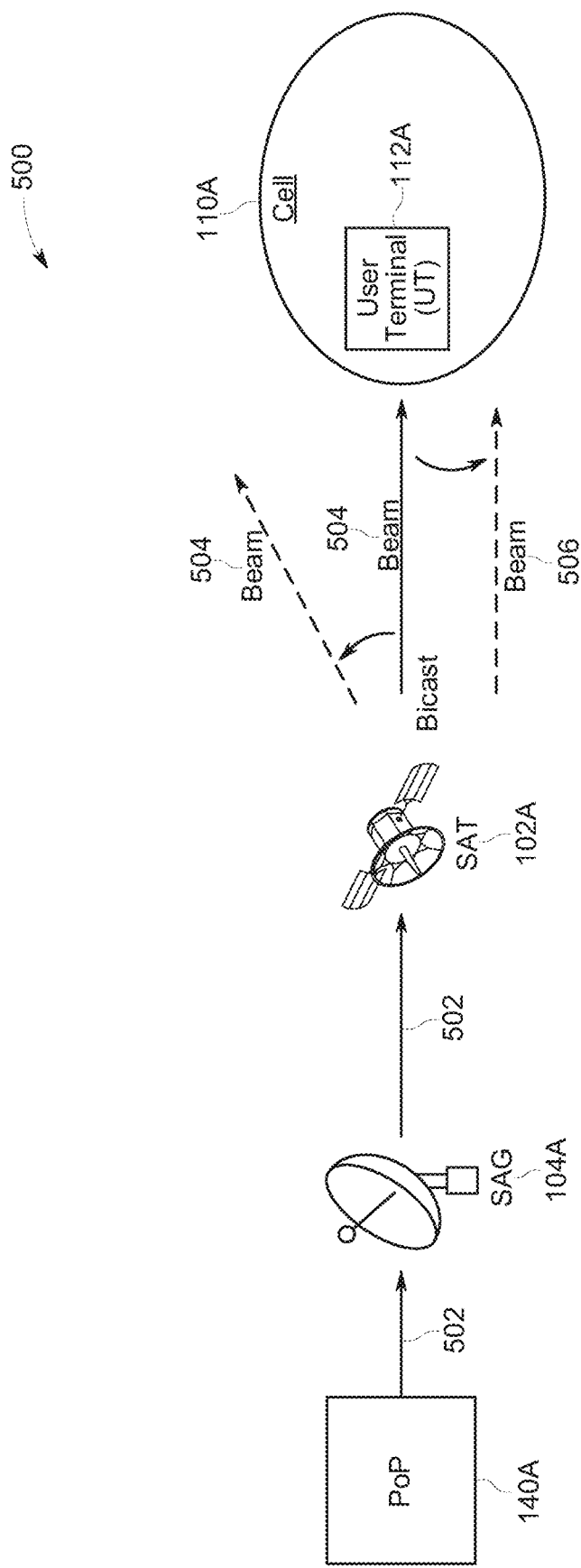
FIG. 5 is a diagram illustrating an example user terminal downlink handover within a same satellite, in accordance with some examples of the present disclosure.

FIG. 5 is a diagram illustrating an example UT downlink handover 500 within a same SAT 102A. In this example, SAT 102A currently serves the cell 110A and the UT 112A in the cell 110A using beam 504, and a handover has been triggered to transfer service to the cell 110A and UT 112A to a different beam 506 on the SAT 102A. In some examples, the UT downlink handover 500 can be triggered based on a new schedule (e.g., 210) fetched from a RDS 125.

In this example, a communication path between the UT 112A and the SAT 102A includes a path 502 from PoP site 140A to SAT 102A, which includes the PoP site 140A, the SAG 104A and the SAT 102A. Packets between the SAT 102A and the UT 112A can be communicated via the beam 504. The UT 112A and SAT 102A can perform a handover where service by the SAT 102A to the UT 112A is transferred from the beam 504 to the beam 506. To prevent packet loss before, during, and/or after the handover, packets transmitted over the beam 504 and the beam 506 can be bicasted.

In some examples, the SAT 102A can enable the old and new routing tables at L3 before the handover is complete to allow the bicasting of packets on the beams 504 and 506. In some cases, before the handover from the beam 504 to the beam 506, the SAT 102A can buffer any packets on the beam 504 and the beam 506, and can discard packets on the beam 504 after the handover is complete. Moreover, the SAT 102A can use a bit, flag, parameter, etc., to indicate that the packets should not be discarded during the handover. For example, the SAT 102A can use a bit flip in the SID associated with the packets to ensure the packets are not discarded during the handover. The SAT 102A can later discard the packets (e.g., via the MAC sublayer) after the handover when L1 Tx/Rx and L2 Tx/Rx are down on the beam 504.

Figure 6:
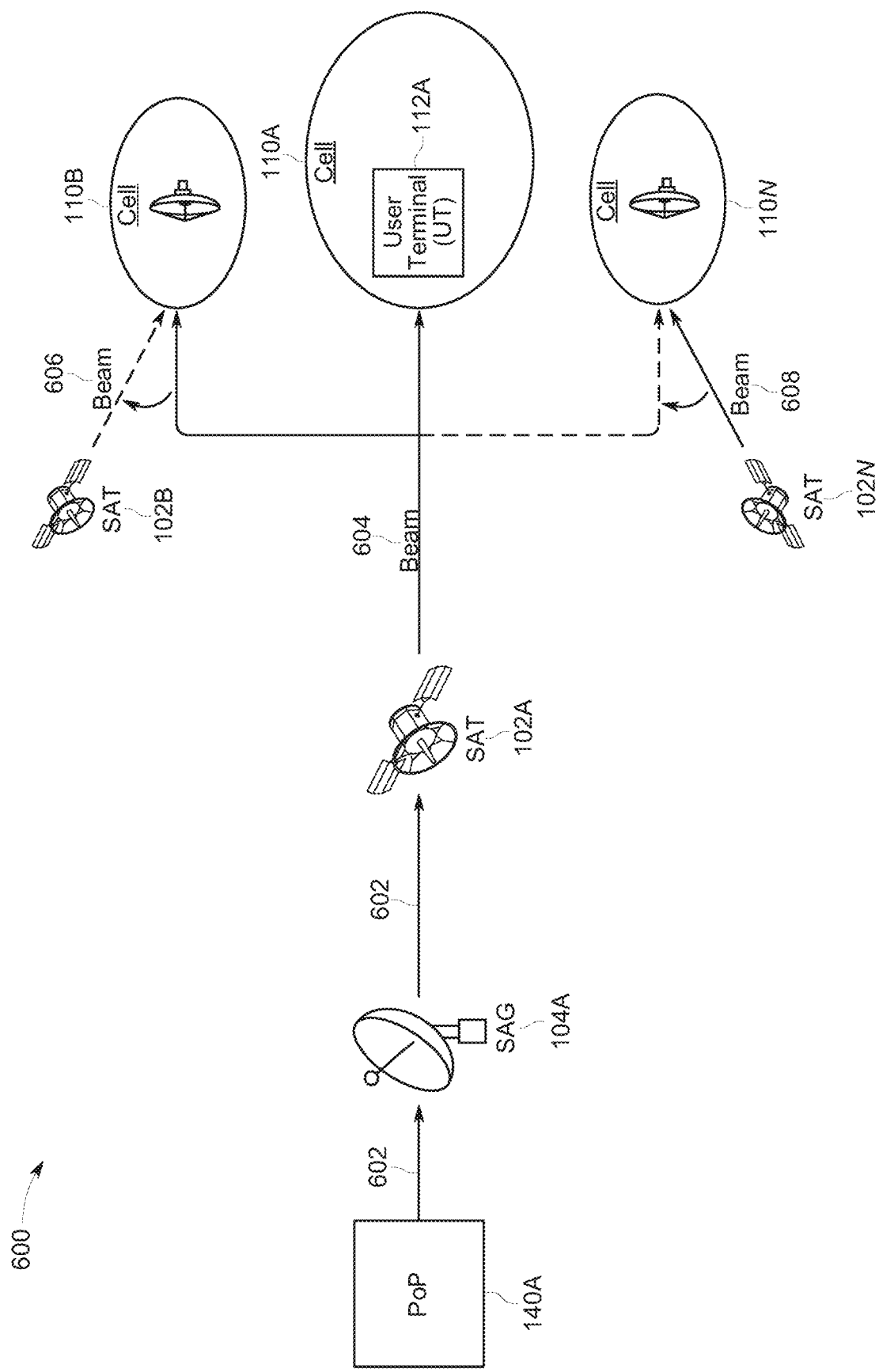
FIG. 6 is a diagram illustrating an example user terminal downlink handover using time-division multiplexing, in accordance with some examples of the present disclosure.

FIG. 6 is a diagram illustrating an example UT downlink handover 600 using time-division multiplexing (TDM). In this example, packets to the cells 110A-N can be transmitted over path 602 including the PoP site 140A, the SAG 104A, and SAT 102A. The SAT 102A can serve cells 110A-N and associated UTs via beam 604 using TDM. The SAT 102A can perform a handover where one or more cells continue to be served by beam 604 from the SAT 102A and/or one or more cells are transferred to a different satellite and/or a different beam on the SAT 102A. In some examples, the UT downlink handover 600 can be triggered based on a new schedule (e.g., 210) fetched from a distribution service (e.g., 344).

TDM is a method or technique used to transmit and receive independent signals over a common signal path or beam where each signal appears on the signal path or beam within a sub-interval of time in an alternating pattern. Thus, TDM allows multiple signals to be transmitted over a common channel. In some examples, two or more signals transmitted over a common communication channel, such as beam 604, can appear as sub-channels in the communication channel. The time domain can be divided into several recurrent time slots, with a time slot for each sub-channel. For example, a sample signal and/or data block of a first sub-channel can be transmitted during a first time slot, a sample signal and/or data block of a second sub-channel can be transmitted during a second time slot, and so forth. In some examples, a TDM radio frame can include a time slot for each sub-channel. Moreover, in some examples, each radio burst in a TDM radio frame can have a respective synchronization signal. In some cases, a TDM radio frame can include an error correction channel before synchronization. After the last sub-channel, error correction, and synchronization, the cycle can restart with a new radio frame as previously described.

In some examples, after the handover, some cells of the beam 604 can remain the same as in a previous time slot; some cells of the beam 604 can be new, such as cells previously served by a different satellite or a different beam on SAT 102A; and/or some cells can migrate to a different beam of the SAT 102A or a different satellite. For example, the beam 604 of SAT 102A can continue to serve cell 110A and UT 112A via a respective time slot on a TDM radio frame, and the beam 604 of SAT 102A can begin to serve (e.g., via a different time slot on the TDM radio frame) cell 110N, which was previously served by SAT 102N. Cell 110B, which was previously served by beam 604 of SAT 102A, can be transferred to SAT 102B. Thus, after the handover, cell 110B can be served by the SAT 102B instead of SAT 102A.

In this example, packets to the remaining cell, cell 110A, can be bicasted from the SAT 102A. The bicasted packets can include a different handover value or bit, and the packets to the cell 110A can be buffered and/or discarded as previously described with respect to the UT downlink handover 500 within the same SAT 102A shown in FIG. 5. To prevent packet loss during the handover, packets to the new cell 110N can be bicasted to their old beam, beam 608 of SAT 102N, and their new beam, beam 604 of SAT 102A. In other examples where the cell 110N is transferred to a new beam of the SAT 102A as opposed to being transferred to SAT 102A from a different satellite, the packets to the cell 110N can be similarly bicasted over beam 604 and the new beam on SAT 102A. Packets for the cell 110B can be bicasted over the beam 604 as well as the beam 606 of SAT 102B that will serve the cell 110B after the handover.

Figure 7:
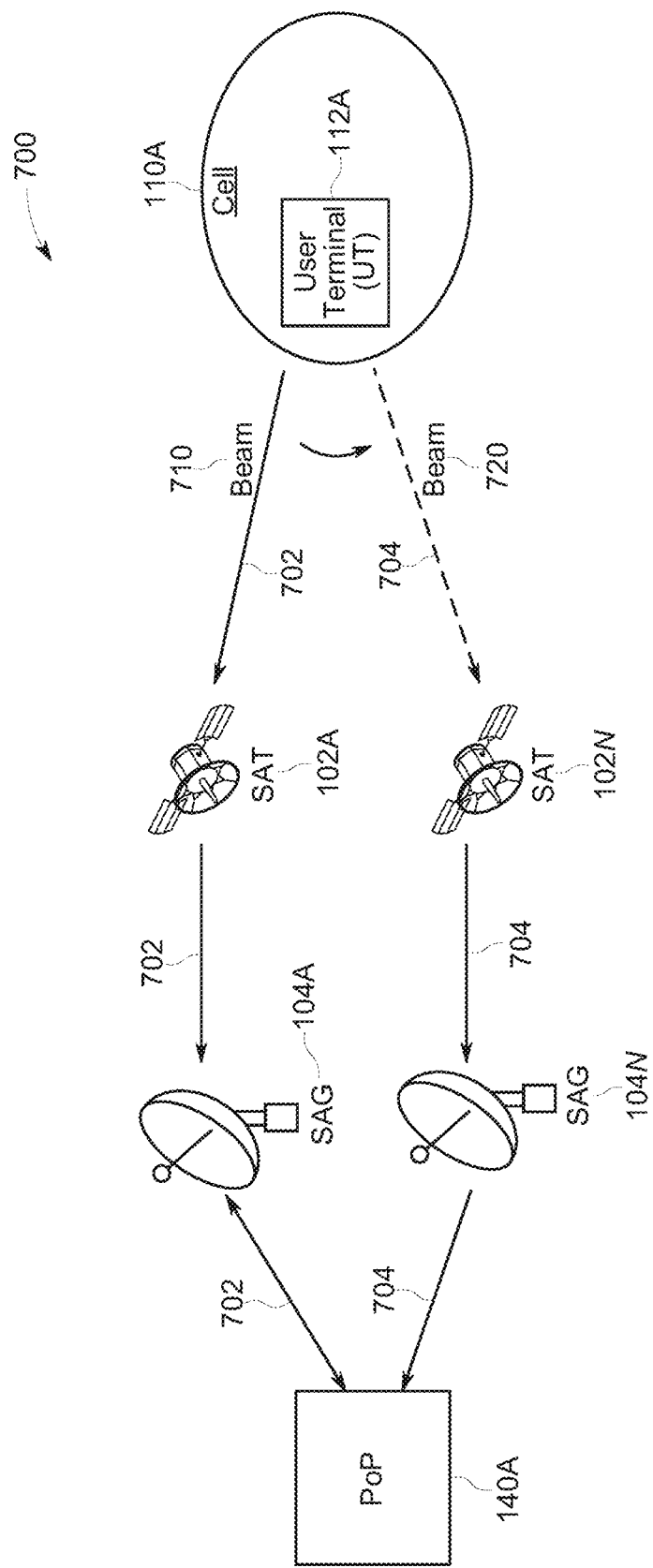
FIG. 7 is a diagram illustrating an example user terminal uplink handover where service to a cell and/or user terminal is transferred between different satellites, in accordance with some examples of the present disclosure.

FIG. 7 is a diagram illustrating an example UT uplink handover 700 where service to the cell 110A and UT 112A is transferred between different satellites. In this example, SAT 102A currently serves the cell 110A and UT 112A. The UT uplink handover 700 has been triggered to transfer service to the cell 110A and UT 112A from SAT 102A to SAT 102N. In some examples, the UT uplink handover 700 can be triggered based on a new schedule (e.g., 210) fetched from a distribution service (e.g., 344).

Prior to the handover, communications from the UT 112A to the SAT 102A are transmitted over the beam 710 and travel from the SAT 102A to the PoP site 140 along a current path 702 from SAT 102A to the PoP site 140A, which includes SAT 102A, SAG 104A, and the PoP site 140A. The cell 110A/UT 112A, the SAT 102A, and the SAT 102N can perform an uplink handover where service for communications from the UT 112A to the SAT 102A is transferred from the SAT 102A to the beam 720 of SAT 102N. For the handover, a new path 704 from the SAT 102N to the PoP site 140A can include SAT 102N, the SAG 104N and the PoP site 140A.

In some cases, before the handover from the SAT 102A to the SAT 102N, the SAT 102N can buffer any packets on the beam 720 (and/or from the UT 112A), and can discard such packets after the handover is complete. Moreover, the PoP site 140A can perform packet sorting since older packets sent from path 702 before the handover could arrive later than newer packets sent from path 704 after the handover.

Figure 8:
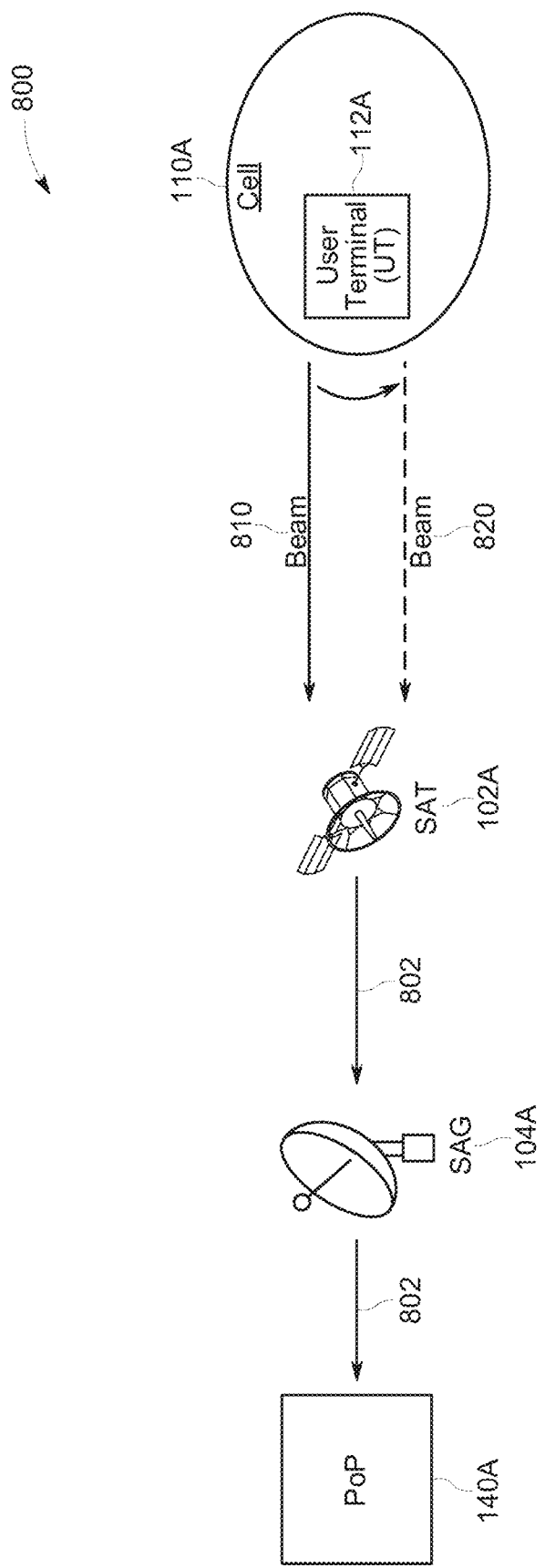
FIG. 8 is a diagram illustrating an example user terminal uplink handover within a same satellite, in accordance with some examples of the present disclosure.

FIG. 8 is a diagram illustrating an example UT uplink handover 800 within a same SAT 102A. In this example, SAT 102A currently serves the cell 110A and the UT 112A in the cell 110A. The UT uplink handover 800 has been triggered to transfer service to the cell 110A and UT 112A from beam 810 to beam 820. In some examples, the UT uplink handover 800 can be triggered based on a new schedule (e.g., 210) fetched from a distribution service (e.g., 344).

Prior to the handover, communications from the UT 112A to the SAT 102A are transmitted over the beam 810 and travel from the SAT 102A to the PoP site 140 along a path 802 from SAT 102A to the PoP site 140A, which includes SAT 102A, SAG 104A, and the PoP site 140A. The cell 110A/UT 112A and the SAT 102A can perform an uplink handover where service for communications from the UT 112A to the SAT 102A is transferred from the beam 810 to the beam 820.

In some cases, before the handover, the SAT 102A can buffer any packets on the beam 820 (and/or from the UT 112A), and can discard such packets after the handover is complete. Moreover, the PoP site 140A can perform packet sorting since older packets sent over beam 810 and path 802 before the handover could arrive later than newer packets sent over beam 820 and path 802 after the handover.

In some examples, the SAT 102A can enable the old and new routing tables at L3 before the handover is complete. Moreover, in some cases, the SAT 102A can use a bit, flag, parameter, etc., to indicate that the packets should not be discarded during the handover. For example, the SAT 102A can use a bit flip in the SID associated with the packets to ensure the packets are not discarded during the handover. The SAT 102A can later discard the packets (e.g., via the MAC sublayer) after the handover when L1 Tx/Rx and L2 Tx/Rx are down on the beam 810.

Having disclosed example systems, components and concepts, the disclosure now turns to the example method 900 for performing low latency handover, as shown in FIG. 9. The steps outlined herein are non-limiting examples provided for illustration purposes, and can be implemented in any combination thereof, including combinations that exclude, add, or modify certain steps.

At block 902, the method 900 can include receiving, by a user terminal (e.g., 112A) associated with a cell (e.g., cell 110A, . . . , 110/V) served by a satellite (e.g., SAT 102A), a schedule (e.g., schedule 210) of communications between the user terminal and one or more satellites (e.g., SAT 102A, SAT 102/V). The schedule can include, for example, one or more times or time slots for the user terminal to communicate with one or more other devices such as, for example, the one or more satellites, one or more satellite gateways, one or more PoP sites, etc.

At block 904, the method 900 can include requesting (e.g., via user terminal 112A), based on the schedule, a handover (e.g., 400, 500, 600, 700, 800) from a beam (e.g., 412, 504, 604, 710, 810) of the satellite (e.g., SAT 102A) to a different beam (e.g., 422, 506, 608, 720, 820) of the satellite or a different satellite (e.g., SAT 102B, . . . , SAT 102N). For example, the schedule can indicate in advance a time and/or time slot for performing the handover and/or for communicating with the different beam of the satellite or the different satellite. Thus, the time and/or time slot in the schedule can be used to request the handover in advance. In some cases, requesting and/or initiating the handover in advance can allow the user terminal to reduce or limit handover latencies and increase handover efficiencies.

At block 906, the method 900 can optionally include processing (e.g., via user terminal 112A), prior to a completion of the handover, packets transmitted over the beam of the satellite and/or the different beam of the one of the satellite or the different satellite. In some cases, processing the packets can include processing packets bicasted and/or sent to the satellite and/or the different satellite over one or more communication paths. For example, in downlink handover scenarios, packets associated with the user terminal can be bicasted and sent over a new path to the satellite or the different satellite, such as a new path from a PoP site to the satellite or the different satellite, so that after the handover, the satellite (and/or a new/different beam of the satellite) or the different satellite can send the packets to the user terminal again. In some cases, the satellite (and/or the new/different beam of the satellite) or the different satellite can send the packets to the user terminal again when the same packets transmitted over a previous path to the satellite and a beam of the satellite are estimated to still reach the user terminal within a certain threshold of confidence.

In some cases, processing the packets can include transmitting packets over the beam of the satellite and/or the different beam of the one of the satellite or the different satellite. For example, in downlink UT handover scenarios (e.g., 400, 500, 600), the satellite and/or the different satellite can transmit duplicate packets over the beam of the satellite and/or the different beam of the satellite or the different satellite. As another example, in the uplink UT handover scenarios (e.g., 700, 800), the user terminal can transmit packets over the beam of the satellite and/or the different beam of the satellite or the different satellite.

In some cases, processing the packets can include receiving duplicate packets transmitted over a new and/or current communication path to the satellite and/or the different satellite. For example, in downlink UT handover scenarios (e.g., 400, 500, 600), the satellite and/or the different satellite can receive duplicate packets transmitted over anew and/or current communication path to the satellite and/or the different satellite. In some cases, the satellite and/or the different satellite can then transmit the packets after the handover over a respective beam(s) associated with the satellite or the different satellite.

In some cases, processing the packets can include receiving duplicate packets transmitted over the beam of the satellite and/or the different beam of the satellite or the different satellite.

At block 908, the method 900 can include performing (e.g., via user terminal 112A) the handover from the beam of the satellite to the different beam of the one of the satellite or the different satellite. In some examples, the data transmission link can include a first satellite gateway (e.g., SAG 104A) and/or a first PoP site (e.g., PoP site 140A), and the different data transmission link can include a second satellite gateway (e.g., SAG 104N) and/or a second PoP site (e.g., PoP site 140N). Moreover, the data transmission link and/or the different data transmission link can include an encrypted tunnel (e.g., 172).

In some cases, performing the handover can include disabling, at a layer 2 (L2) of the user terminal, receive (Rx) and transmit (Tx) communications associated with the user terminal and/or the beam of the satellite; disabling, at a layer 1 (L1) of the user terminal, one or more Rx and Tx interfaces used for communications associated with the beam of the satellite; and terminating a data transmission link (e.g., 202) between the user terminal and the beam of the satellite. Moreover, performing the handover can also include enabling, at the L2 of the user terminal, Rx and Tx communications associated with the user terminal and the different beam of the satellite or the different satellite; and establishing a different data transmission link (e.g., 206) including the user terminal and the different beam associated with the satellite or the different satellite.

In some examples, establishing a different data transmission link can include configuring, at the L1 of the user terminal, one or more Rx and Tx interfaces for communications between the user terminal and the different beam associated with the satellite or the different satellite. The data transmission link and/or the different data transmission link can include a satellite gateway (e.g., SAG 104A, ... , SAG 104N) and/or a point-of-presence (PoP) site (e.g., PoP site 140A), ... , PoP site 140N).

In some cases, performing the handover can also include disabling, at the user terminal, a beam pointing service associated with Rx and Tx beams; and after terminating the data transmission link, enabling the beam pointing service for the different beam associated with the satellite or the different satellite.

At block 910, the method 900 can include transmitting (e.g., via user terminal 112A) after the handover, transmitting, one or more packets via the different beam of the one of the satellite or the different satellite.

In some examples, the method 900 may be performed by one or more computing devices or apparatuses. In one illustrative example, the method 900 can be performed by a user terminal or SAT shown in FIG. 1A and/or one or more computing devices with the computing device architecture 1000 shown in FIG. 10. In some cases, such a computing device or apparatus may include a processor, microprocessor, microcomputer, or other component of a device that is configured to carry out the steps of the method 900. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The method 900 is illustrated as a logical flow diagrams, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 10 illustrates an example computing device architecture 1000 of an example computing device which can implement various techniques described herein. For example, the computing device architecture 1000 can be used to implement at least some portions of the SATs 102, the SAGs 104, the PoP sites 140, the user terminals 112 and/or the user network devices 114 shown in FIGS. 1A, 1B, and 1C, and perform at least some of the low latency handover operations described herein. The components of the computing device architecture 1000 are shown in electrical communication with each other using a connection 1005, such as a bus. The example computing device architecture 1000 includes a processing unit (CPU or processor) 1010 and a computing device connection 1005 that couples various computing device components including the computing device memory 1015, such as read only memory (ROM) 1020 and random access memory (RAM) 1025, to the processor 1010.

The computing device architecture 1000 can include a cache of high-speed memory connected directly with, in close proximity to, or integrated as part of the processor 1010. The computing device architecture 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other computing device memory 1015 may be available for use as well. The memory 1015 can include multiple different types of memory with different performance characteristics. The processor 1010 can include any general purpose processor and a hardware or software service stored in storage device 1030 and configured to control the processor 1010 as well as a special-purpose processor where software instructions are incorporated into the processor design. The processor 1010 may be a self-contained system, containing multiple cores or processors, a bus, memory controller, cache, etc. A multi-core processor may be symmetric or asymmetric.

To enable user interaction with the computing device architecture 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art, such as a display, projector, television, speaker device. In some instances, multimodal computing devices can enable a user to provide multiple types of input to communicate with the computing device architecture 1000. The communication interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. The storage device 1030 can include software, code, firmware, etc., for controlling the processor 1010. Other hardware or software modules are contemplated. The storage device 1030 can be connected to the computing device connection 1005. In one aspect, a hardware module that performs a particular function can include the software component stored in a computer-readable medium in connection with the necessary hardware components, such as the processor 1010, connection 1005, output device 1035, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication devices, or integrated circuit devices having multiple uses including application in wireless communications and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
receiving, by a user terminal associated with a cell served by a satellite, a schedule of communications between the user terminal and one or more satellites, wherein the one or more satellites comprises the satellite and a different satellite;
requesting, based on the schedule, a handover from a beam of the satellite to a different beam of one of the satellite or the different satellite;
prior to a completion of the handover, processing packets transmitted over at least one of the beam of the satellite and the different beam of the one of the satellite or the different satellite;
performing the handover from the beam of the satellite to the different beam of the one of the satellite or the different satellite; and
after the handover, transmitting, by the user terminal, one or more packets via the different beam of the one of the satellite or the different satellite.

2. The method of claim 1, wherein processing the packets comprises transmitting or receiving the packets over the at least one of the beam of the satellite and the different beam of the one of the satellite or the different satellite.

3. The method of claim 1, wherein processing the packets comprises receiving duplicate packets transmitted over the beam of the satellite and the different beam of the one of the satellite or the different satellite.

4. The method of claim 1, wherein performing the handover comprises:
disabling, at a layer 2 (L2) of the user terminal, receive (Rx) and transmit (Tx) communications associated with at least one of the user terminal and the beam of the satellite;
disabling, at a layer 1 (L1) of the user terminal, one or more Rx and Tx interfaces used for communications associated with the beam of the satellite; and
terminating a data transmission link comprising the user terminal and the beam of the satellite.

5. The method of claim 4, wherein performing the handover comprises:
enabling, at the L2 of the user terminal, Rx and Tx communications associated with the user terminal and the different beam of the one of the satellite or the different satellite;
configuring, at the L1 of the user terminal, one or more Rx and Tx interfaces for communications between the user terminal and the different beam associated with the one of the satellite or the different satellite; and
establishing a different data transmission link comprising the user terminal and the different beam associated with the one of the satellite or the different satellite.

6. The method of claim 5, wherein the data transmission link and the different data transmission link comprise at least one of a satellite gateway and a point-of-presence (PoP) site.

7. The method of claim 5, wherein the data transmission link comprises at least one of a first satellite gateway and a first PoP site, and wherein the different data transmission link comprises at least one of a second satellite gateway and a second PoP site.

8. The method of claim 5, wherein performing the handover comprises:
disabling, at the user terminal, a beam pointing service associated with at least one of Rx and Tx beams; and
after terminating the data transmission link comprising the user terminal and the beam of the satellite, enabling the beam pointing service for the different beam associated with the one of the satellite or the different satellite.

9. At least one non-transitory computer-readable storage medium comprising instructions stored thereon which, when executed by one or more processors, cause the one or more processors to:
receive, by a user terminal associated with a cell served by a satellite, a schedule of communications between the user terminal and one or more satellites, wherein the one or more satellites comprises the satellite and a different satellite;
request, based on the schedule, a handover from a beam of the satellite to a different beam of one of the satellite or the different satellite;
process packets transmitted over at least one of the beam of the satellite and the different beam of the one of the satellite or the different satellite;
perform the handover from the beam of the satellite to the different beam of the one of the satellite or the different satellite; and
after the handover, transmit, by the user terminal, one or more packets via the different beam of the one of the satellite or the different satellite.

10. The at least one non-transitory computer-readable storage medium of claim 9, wherein processing the packets comprises transmitting the packets over the at least one of the beam of the satellite and the different beam of the one of the satellite or the different satellite.

11. The at least one non-transitory computer-readable storage medium of claim 9, wherein processing the packets comprises receiving duplicate packets transmitted over the beam of the satellite and the different beam of the one of the satellite or the different satellite.

12. The at least one non-transitory computer-readable storage medium of claim 9, wherein performing the handover comprises:
disabling, at a layer 2 (L2) of the user terminal, receive (Rx) and transmit (Tx) communications associated with at least one of the user terminal and the beam of the satellite;
disabling, at a layer 1 (L1) of the user terminal, one or more Rx and Tx interfaces used for communications associated with the beam of the satellite; and
terminating a data transmission link comprising the user terminal and the beam of the satellite.

13. The at least one non-transitory computer-readable storage medium of claim 12, wherein performing the handover comprises:
enabling, at the L2 of the user terminal, Rx and Tx communications associated with the user terminal and the different beam of the one of the satellite or the different satellite;
configuring, at the L1 of the user terminal, one or more Rx and Tx interfaces for communications between the user terminal and the different beam associated with the one of the satellite or the different satellite; and
establishing a different data transmission link comprising the user terminal and the different beam associated with the one of the satellite or the different satellite.

14. The at least one non-transitory computer-readable storage medium of claim 13, wherein the data transmission link and the different data transmission link comprise at least one of a satellite gateway and a point-of-presence (PoP) site, and wherein performing the handover comprises:

disabling, at the user terminal, a beam pointing service associated with at least one of Rx and Tx beams; and after terminating the data transmission link comprising the user terminal and the beam of the satellite, enabling the beam pointing service for the different beam associated with the one of the satellite or the different satellite.

15. A user terminal comprising:

one or more processors; and at least one non-transitory computer-readable medium having stored thereon instructions that, when executed by the one or more processors, cause the one or more processors to:

receive a schedule of communications between the user terminal and one or more satellites, wherein the one or more satellites comprises a satellite and a different satellite;

request, based on the schedule, a handover from a beam of the satellite serving a cell associated with the user terminal to a different beam of one of the satellite or the different satellite;

process packets transmitted over at least one of the beam of the satellite and the different beam of the one of the satellite or the different satellite;

perform the handover from the beam of the satellite to the different beam of the one of the satellite or the different satellite; and after the handover, transmit one or more packets via the different beam of the one of the satellite or the different satellite.

16. The user terminal of claim 15, wherein processing the packets comprises transmitting packets over the at least one of the beam of the satellite and the different beam of the one of the satellite or the different satellite.

17. The user terminal of claim 15, wherein processing the packets comprises receiving duplicate packets transmitted over the at least one of the beam of the satellite and the different beam of the one of the satellite or the different satellite.

18. The user terminal of claim 15, wherein performing the handover comprises:

disabling, at a layer 2 (L2) of the user terminal, receive (Rx) and transmit (Tx) communications associated with at least one of the user terminal and the beam of the satellite;

disabling, at a layer 1 (L1) of the user terminal, one or more Rx and Tx interfaces used for communications associated with the beam of the satellite;

terminating a data transmission link comprising the user terminal and the beam of the satellite;

enabling, at the L2 of the user terminal, Rx and Tx communications associated with the user terminal and the different beam of the one of the satellite or the different satellite;

configuring, at the L1 of the user terminal, one or more Rx and Tx interfaces for communications between the user terminal and the different beam associated with the one of the satellite or the different satellite; and establishing a different data transmission link comprising the user terminal and the different beam associated with the one of the satellite or the different satellite.

19. The user terminal of claim 18, wherein the data transmission link and the different data transmission link comprise at least one of a satellite gateway and a point-of-presence (PoP) site.

20. The user terminal of claim 18, wherein performing the handover comprises:

disabling a beam pointing service associated with at least one of Rx and Tx beams; and after terminating the data transmission link, enabling the beam pointing service for the different beam associated with the one of the satellite or the different satellite.

* * * * *